April 7, 1931. E. H. LORENZ 1,800,191
APPARATUS FOR SHAPING GLASS
Filed June 14, 1922 21 Sheets-Sheet 7
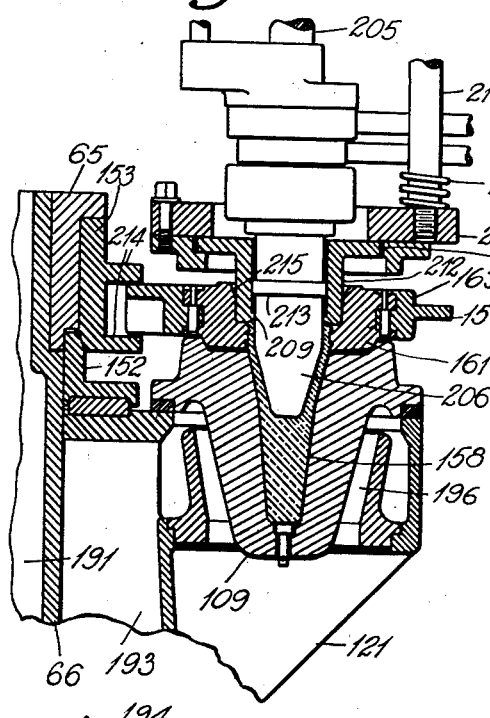
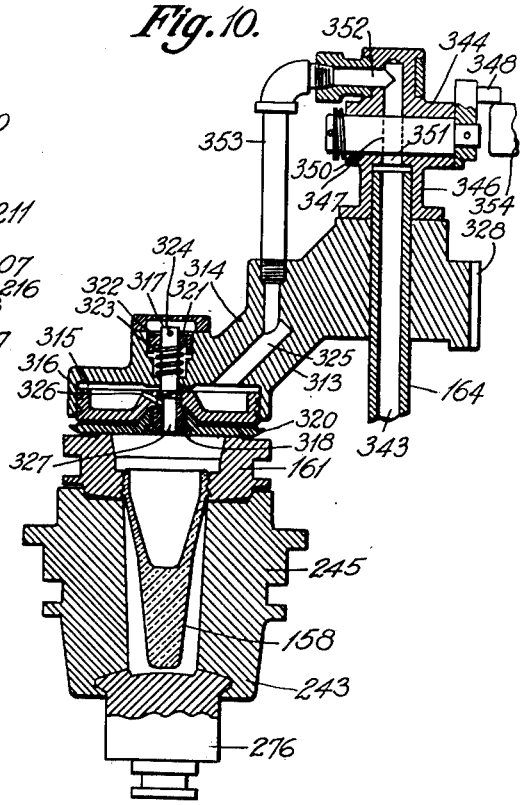
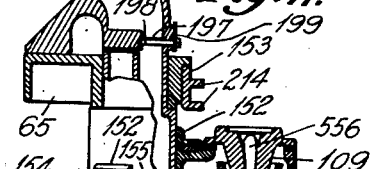
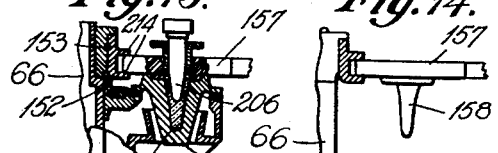
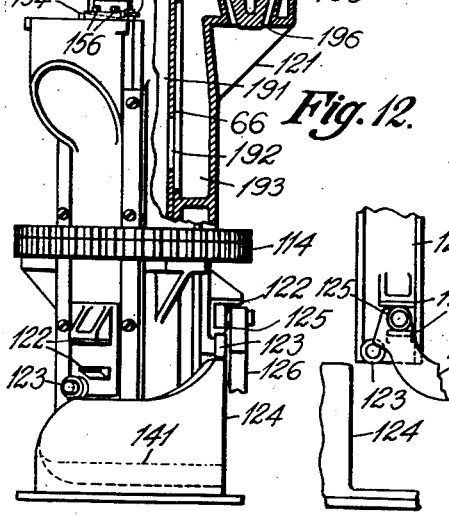
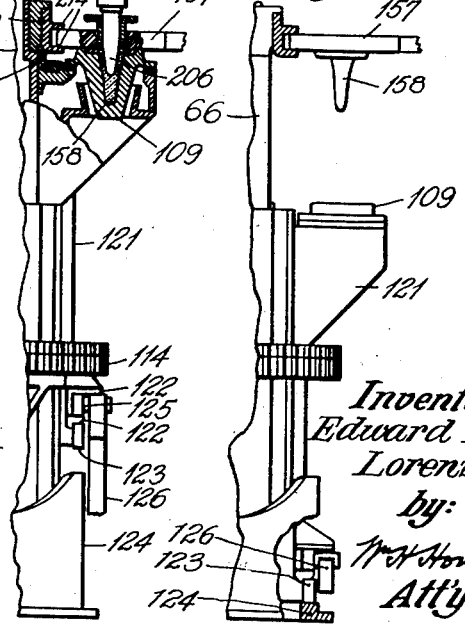
Inventor:
Edward H. Lorenz
by:
Att'y.

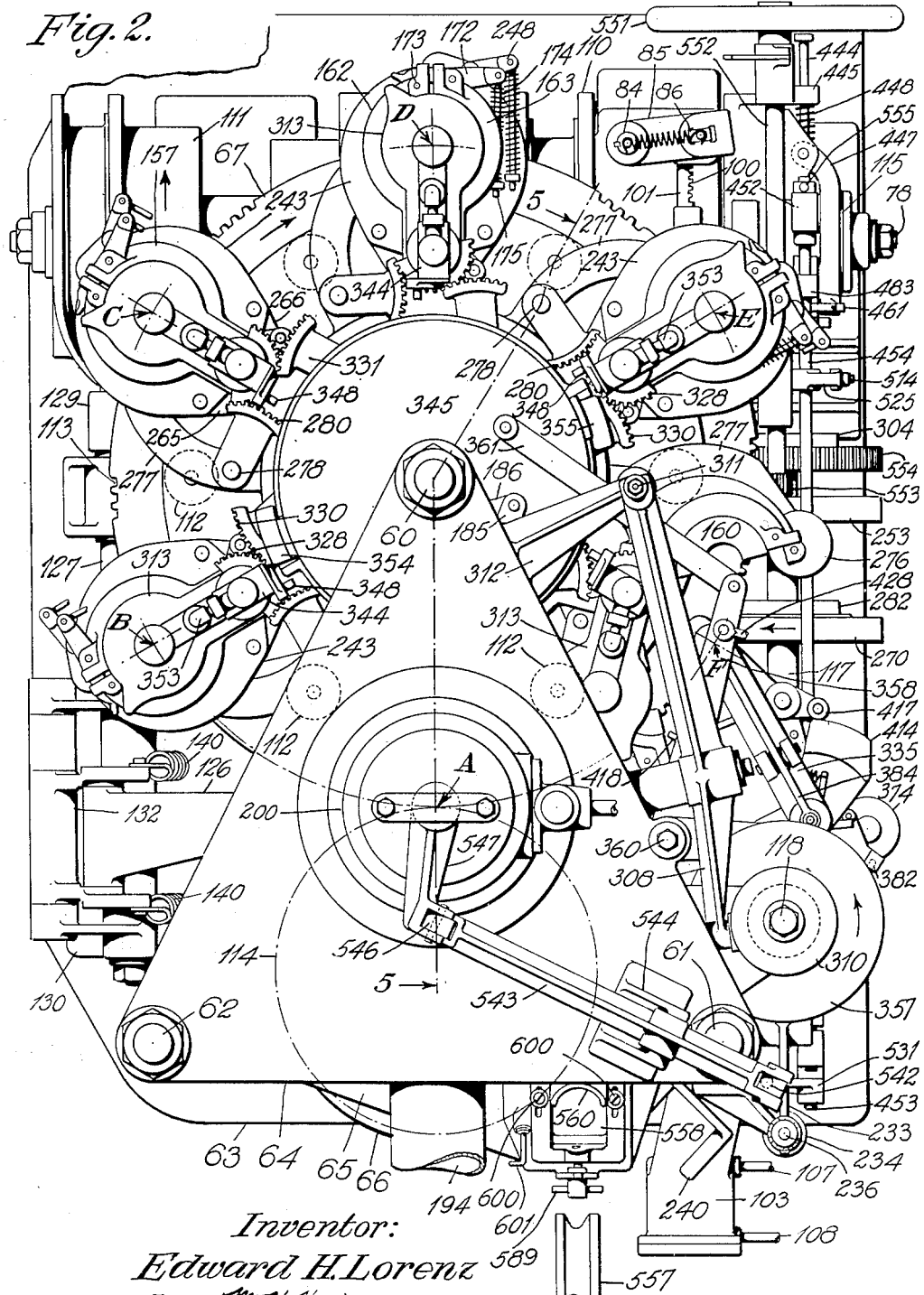

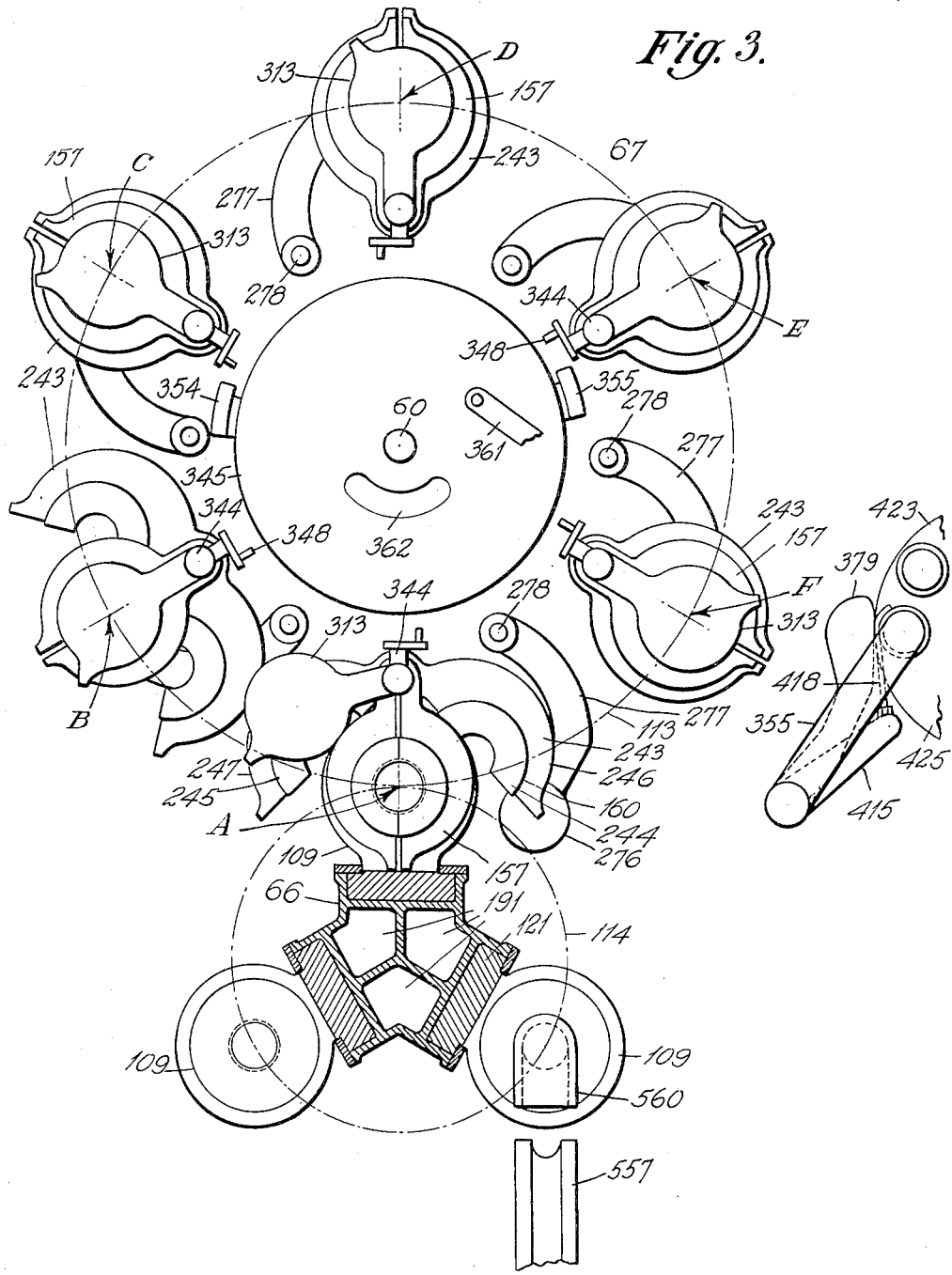

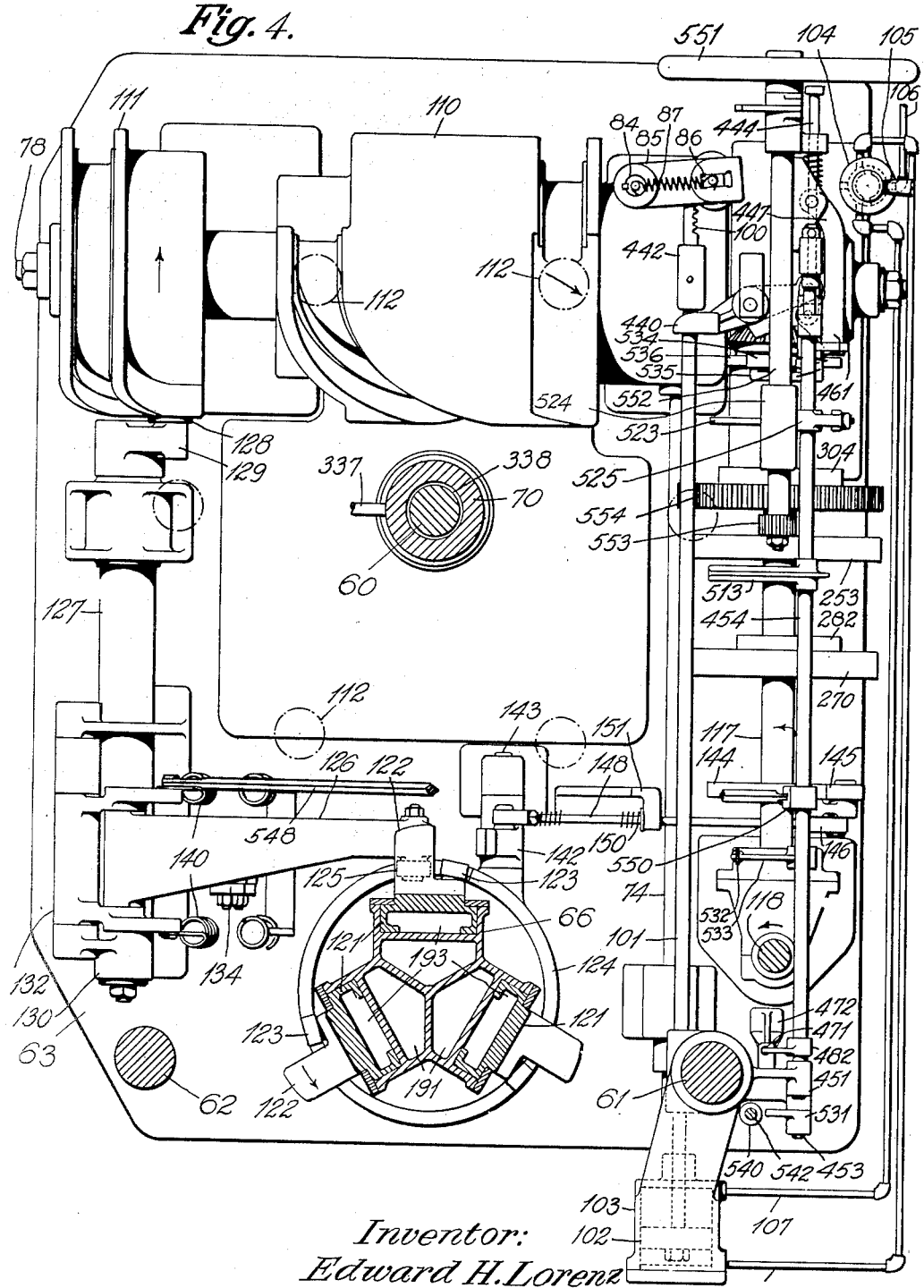

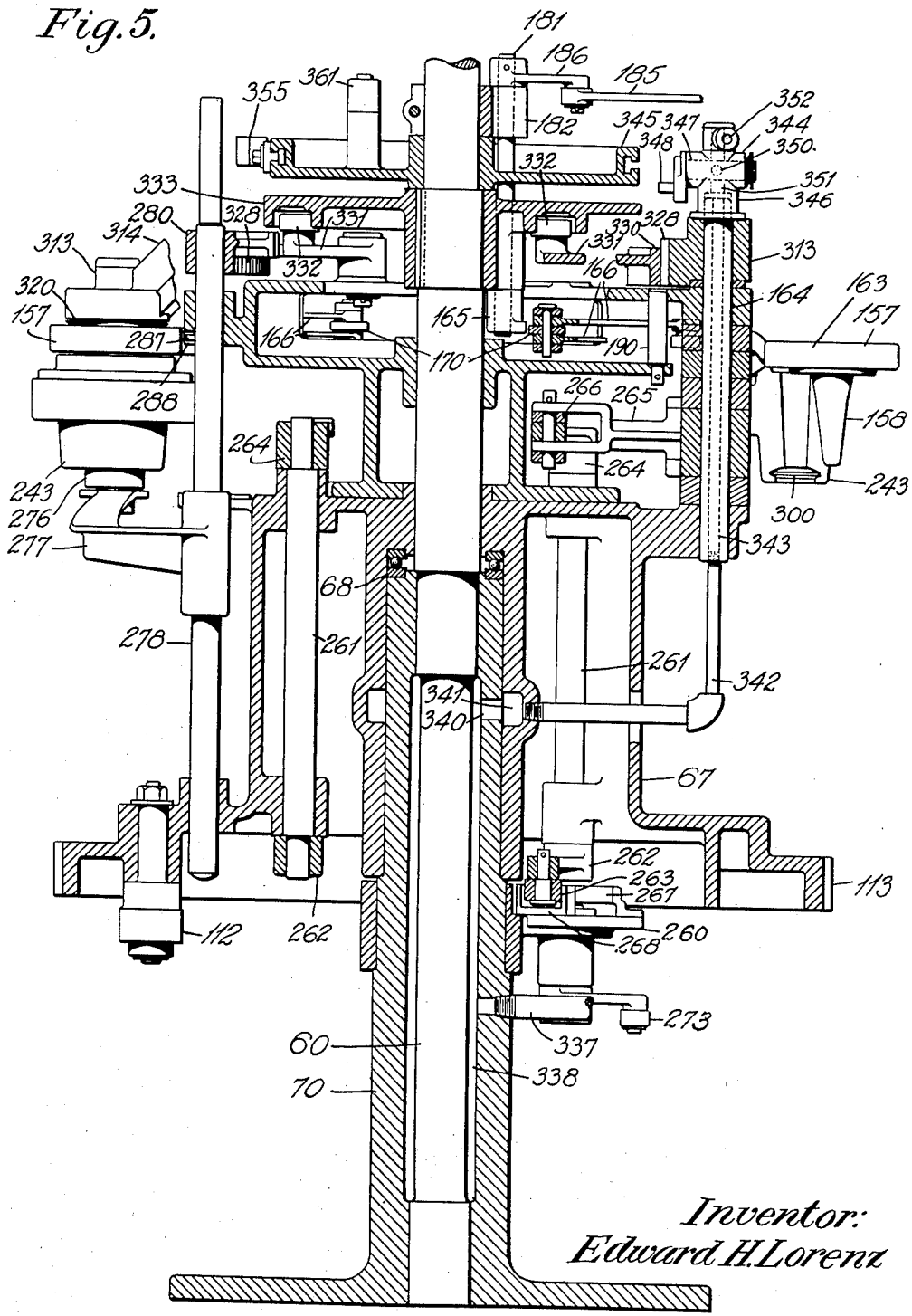

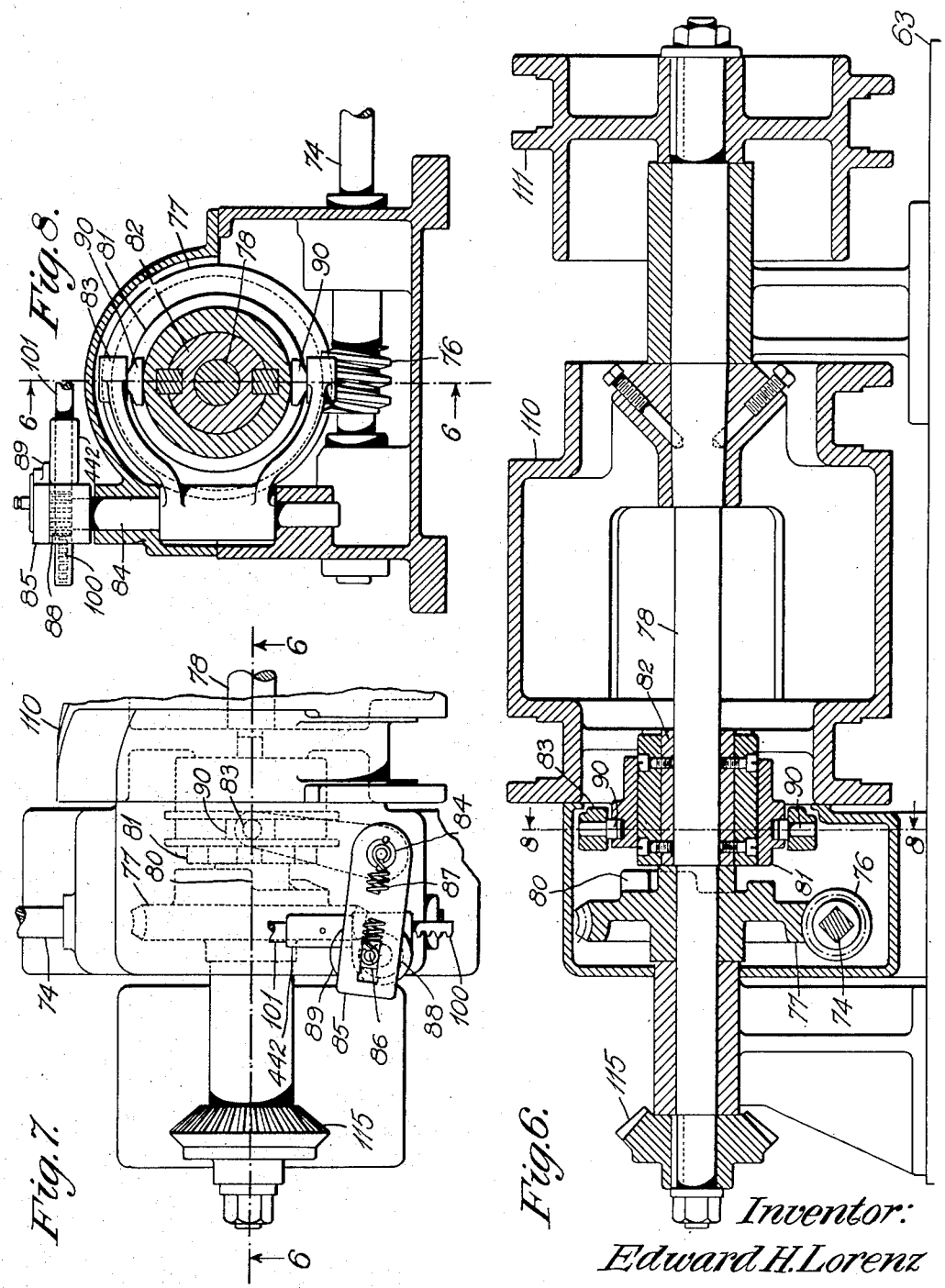

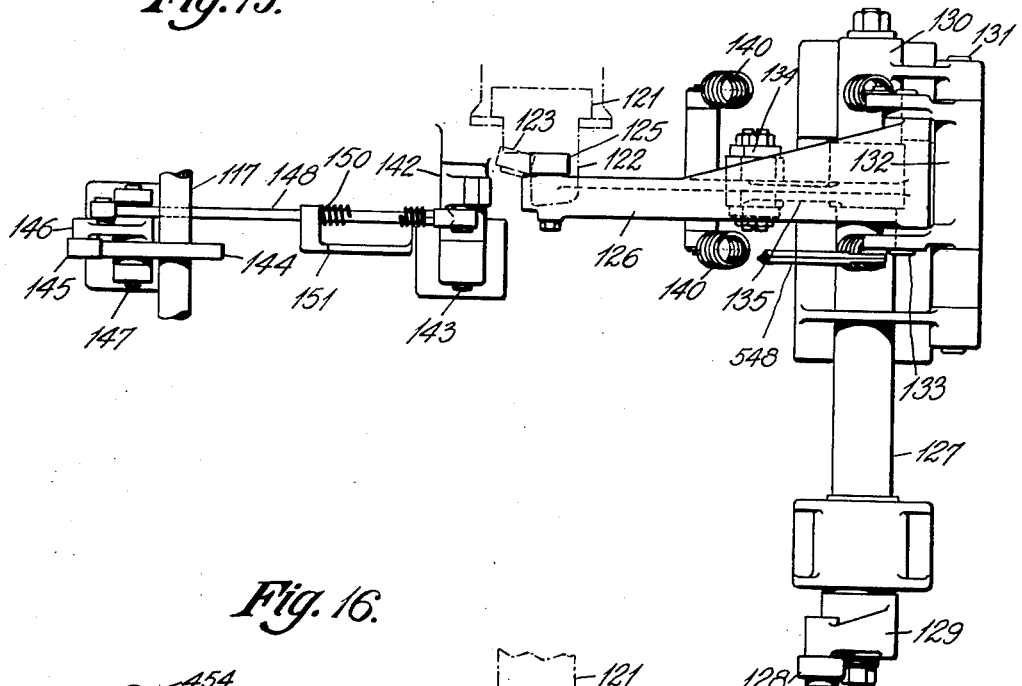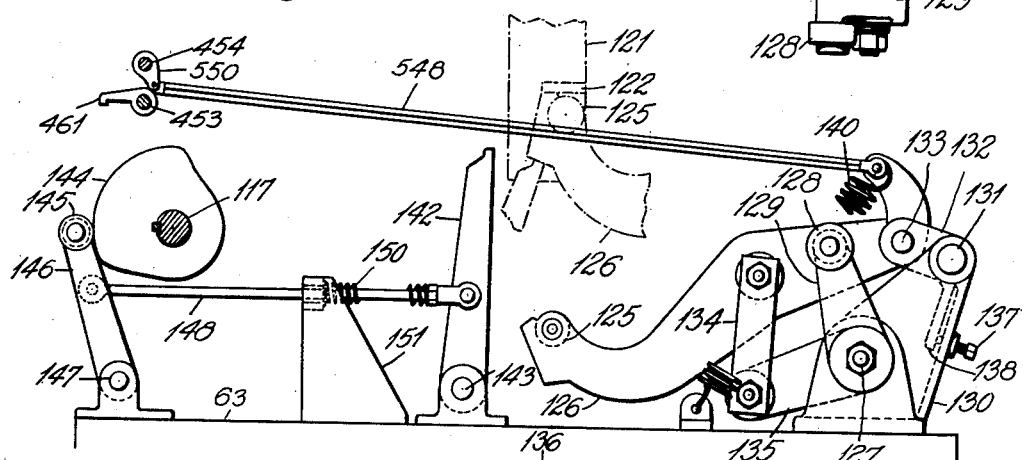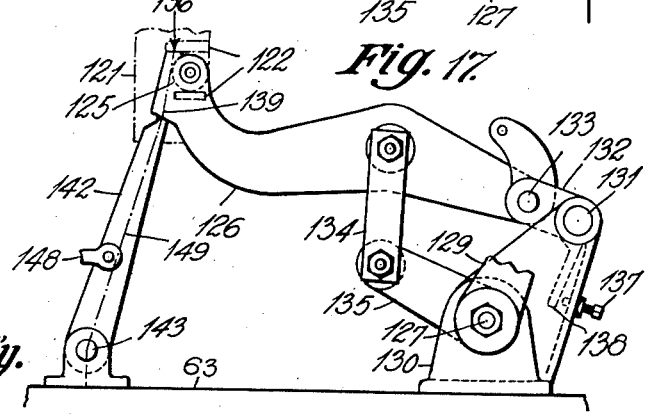

April 7, 1931. E. H. LORENZ 1,800,191
APPARATUS FOR SHAPING GLASS
Filed June 14, 1922 21 Sheets-Sheet 9

Inventor:
Edward H. Lorenz
by: W. H. Honiss Att'y.

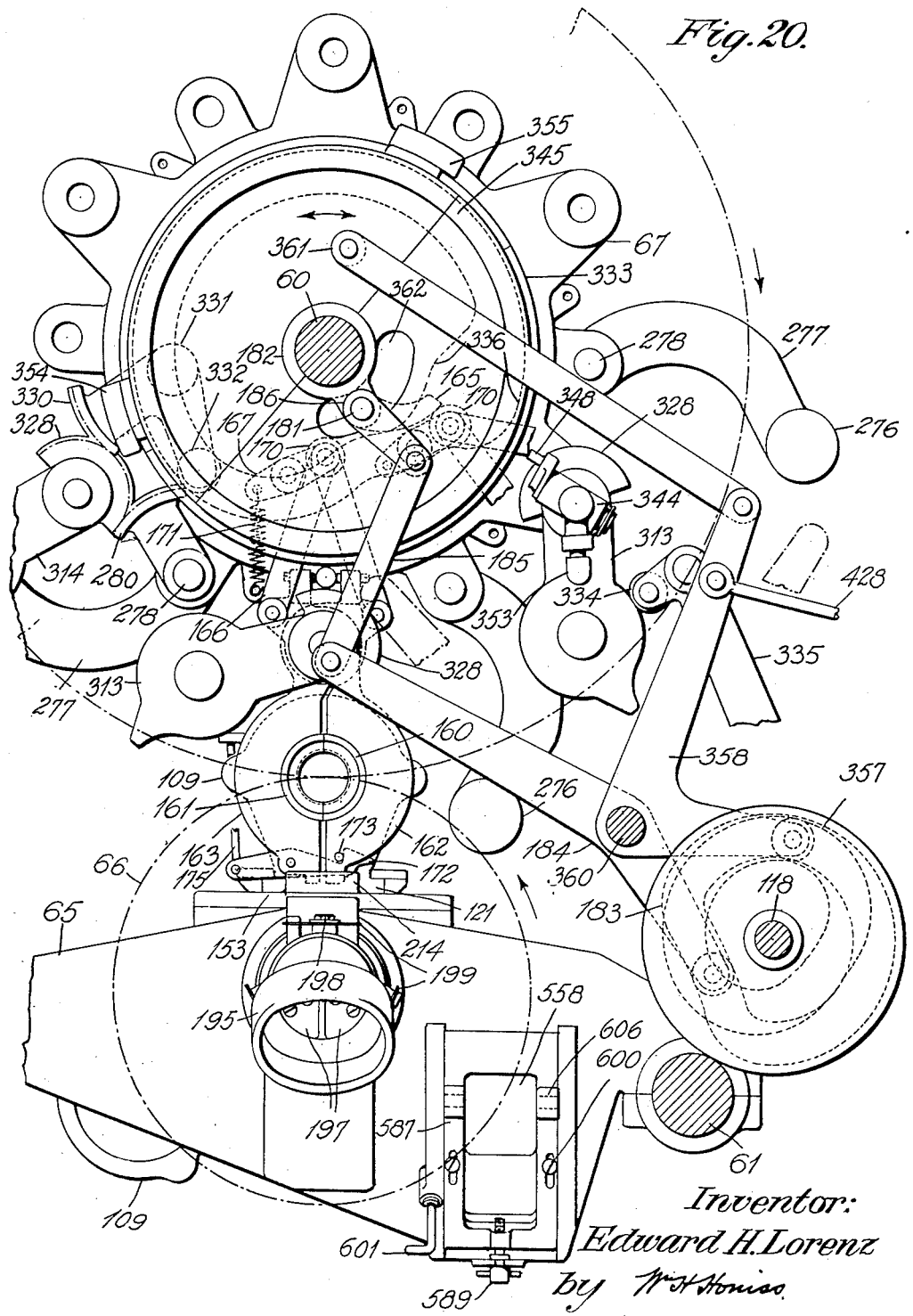

April 7, 1931.  E. H. LORENZ  1,800,191
APPARATUS FOR SHAPING GLASS
Filed June 14, 1922  21 Sheets-Sheet 11
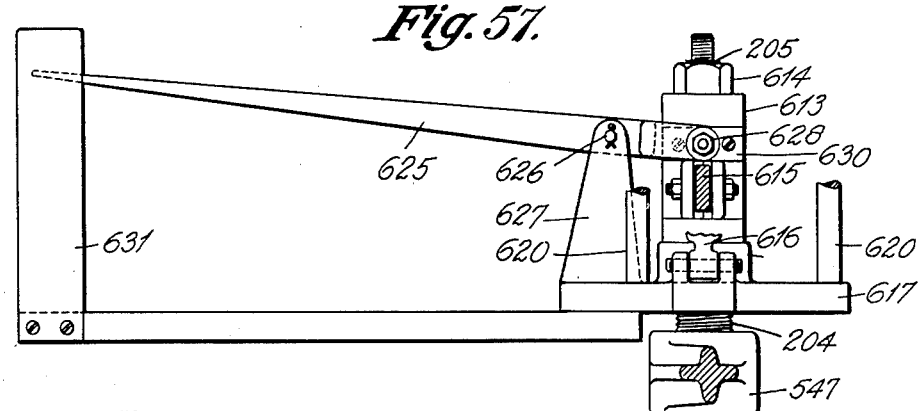
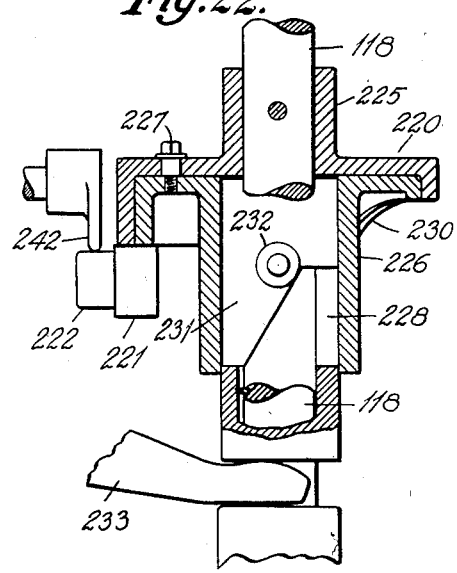
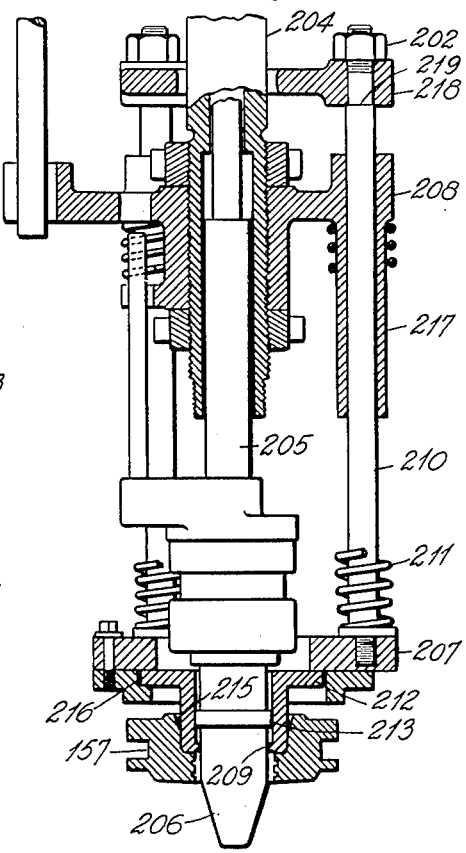
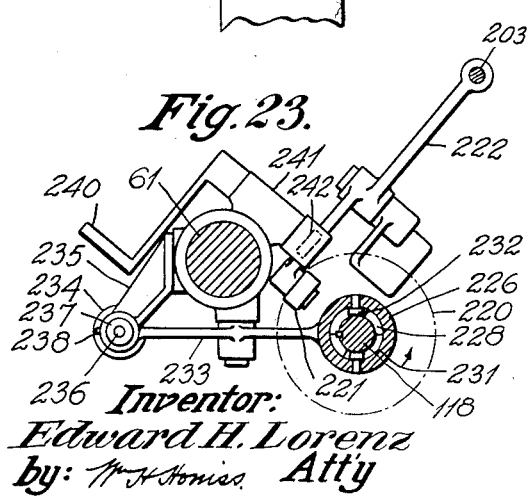
Inventor:
Edward H. Lorenz
by: Atty April 7, 1931.  E. H. LORENZ  1,800,191
APPARATUS FOR SHAPING GLASS
Filed June 14, 1922  21 Sheets-Sheet 12
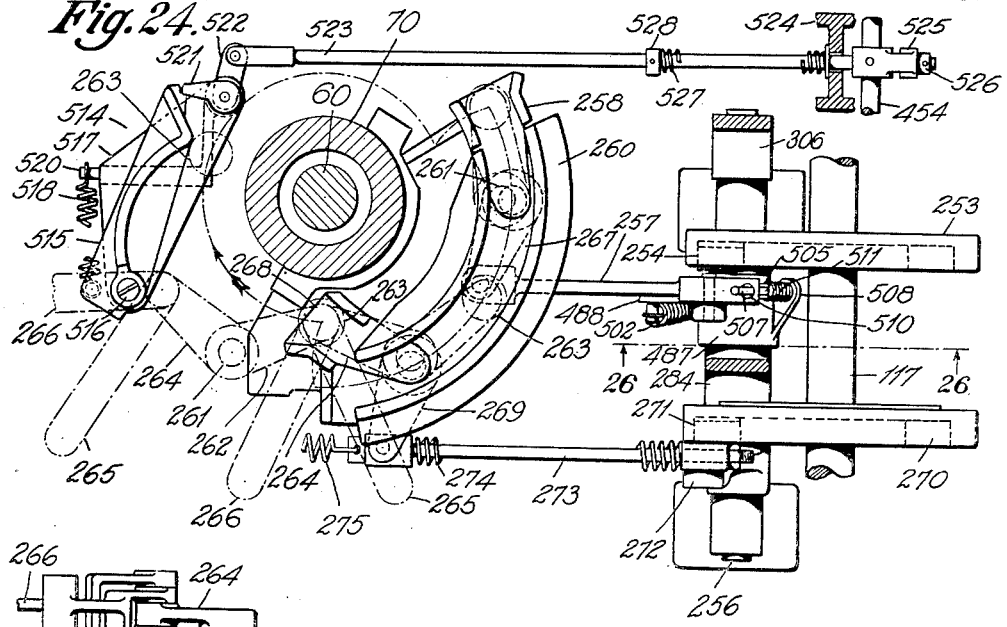
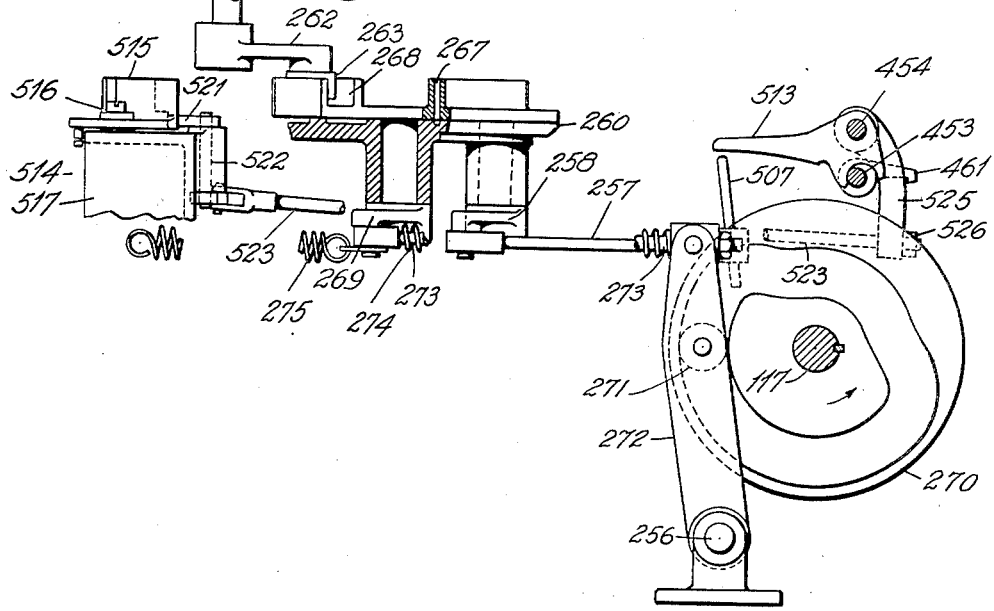
Inventor:
Edward H. Lorenz
by: W. H. Homiss Att'y.

April 7, 1931. E. H. LORENZ 1,800,191
APPARATUS FOR SHAPING GLASS
Filed June 14, 1922 21 Sheets-Sheet 13
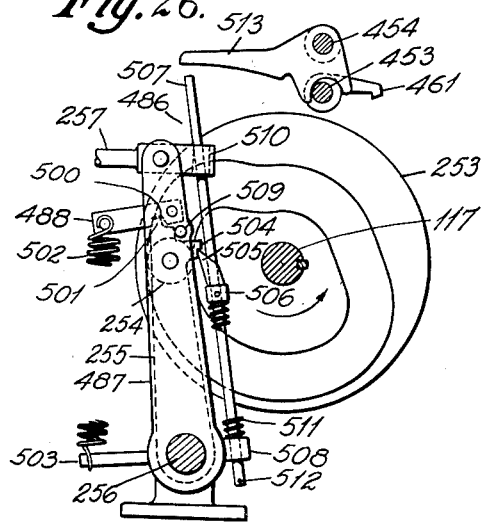
Fig. 26.
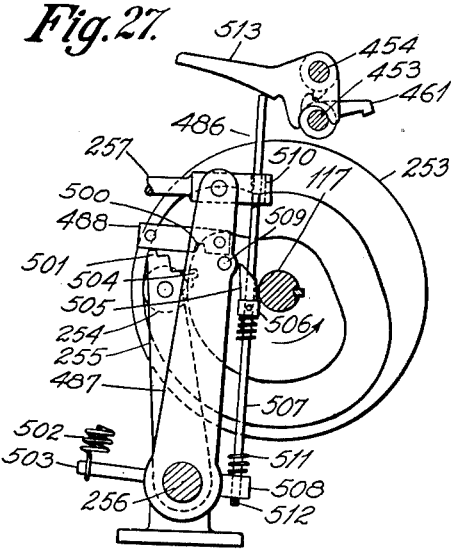
Fig. 27.
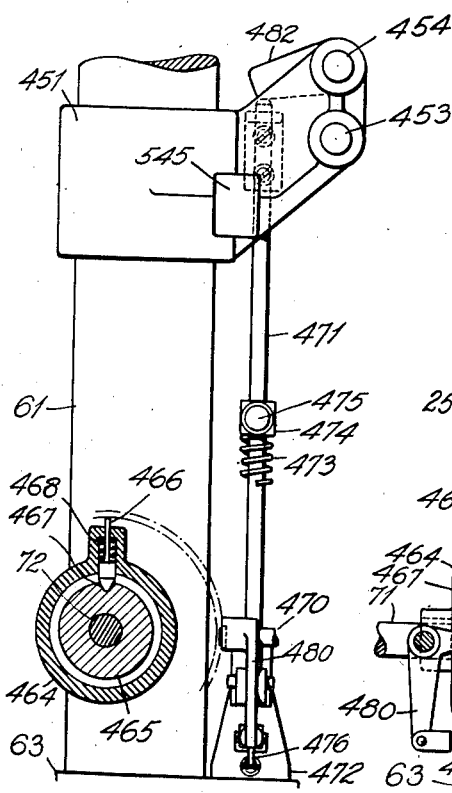
Fig. 45.
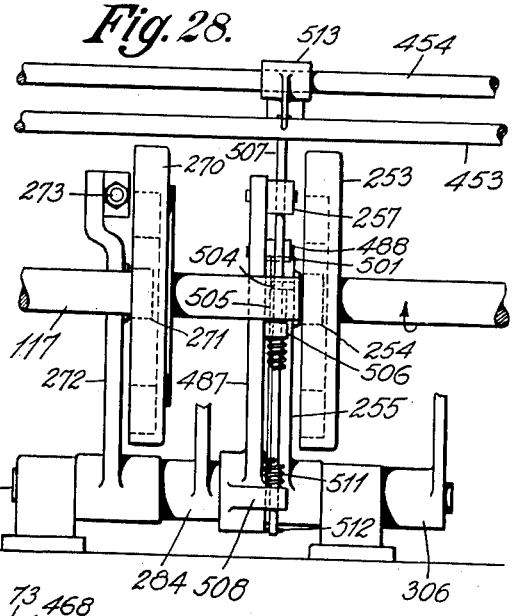
Fig. 28.
Fig. 46.
Inventor:
Edward H. Lorenz
by: [signature]
Att'y.

April 7, 1931.  E. H. LORENZ  1,800,191
APPARATUS FOR SHAPING GLASS
Filed June 14, 1922   21 Sheets-Sheet 14
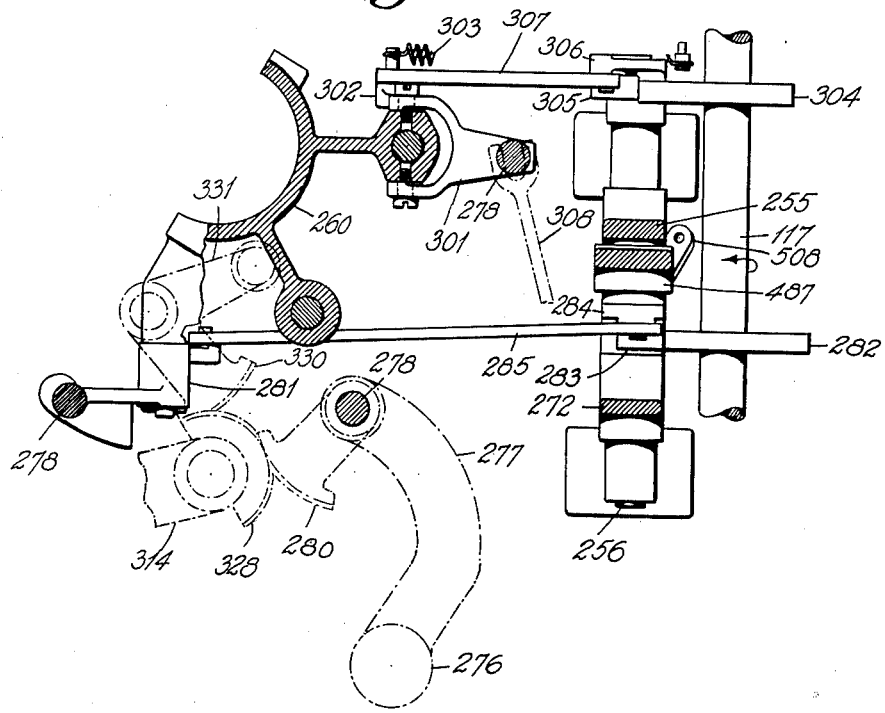
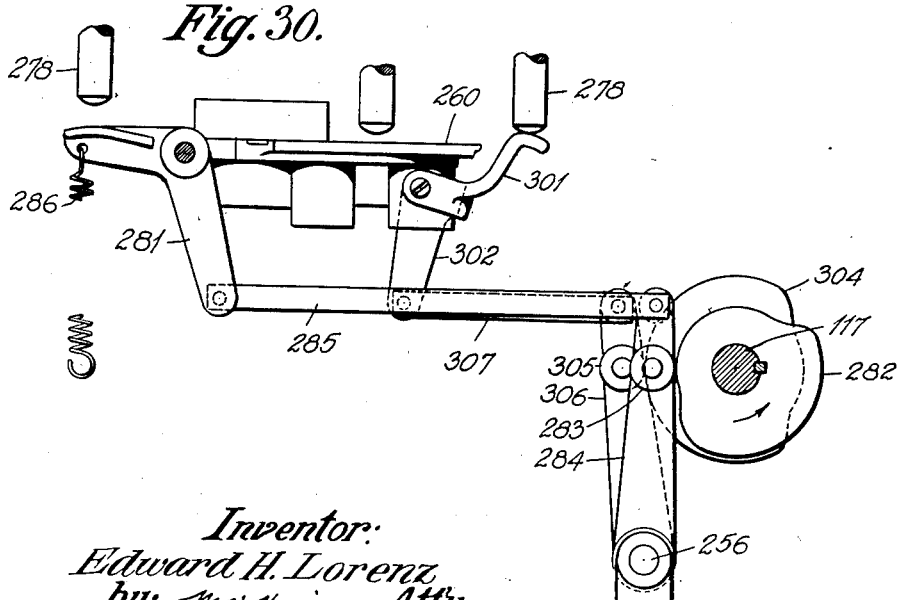
Inventor:
Edward H. Lorenz
by: *W H Homiss* Att'y.

April 7, 1931.   E. H. LORENZ   1,800,191
APPARATUS FOR SHAPING GLASS
Filed June 14, 1922   21 Sheets-Sheet 15
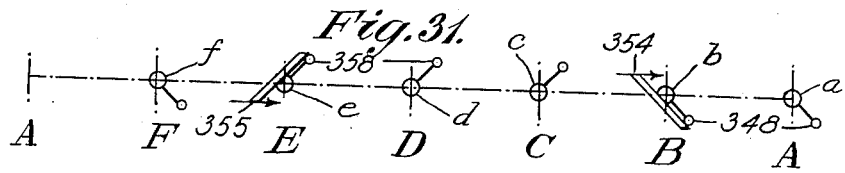
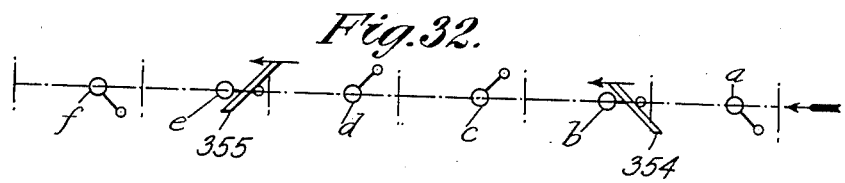
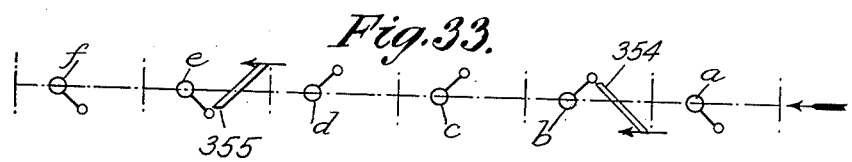
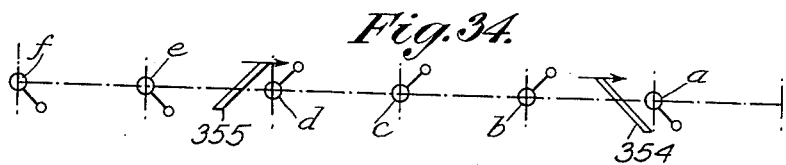
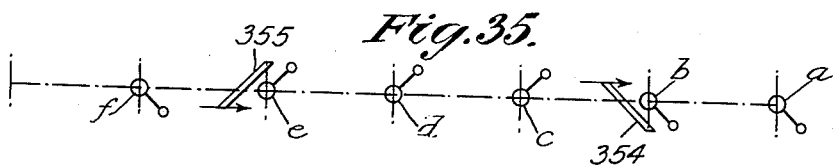
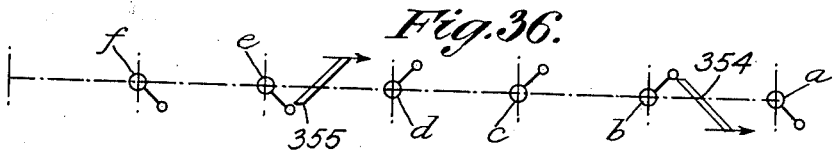
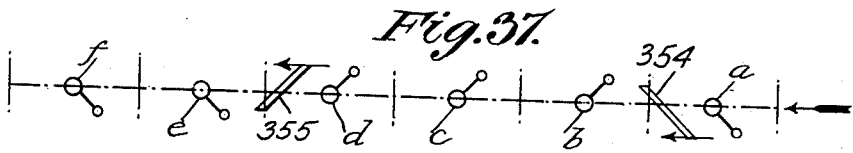
Inventor:
Edward H. Lorenz
by
Atty.

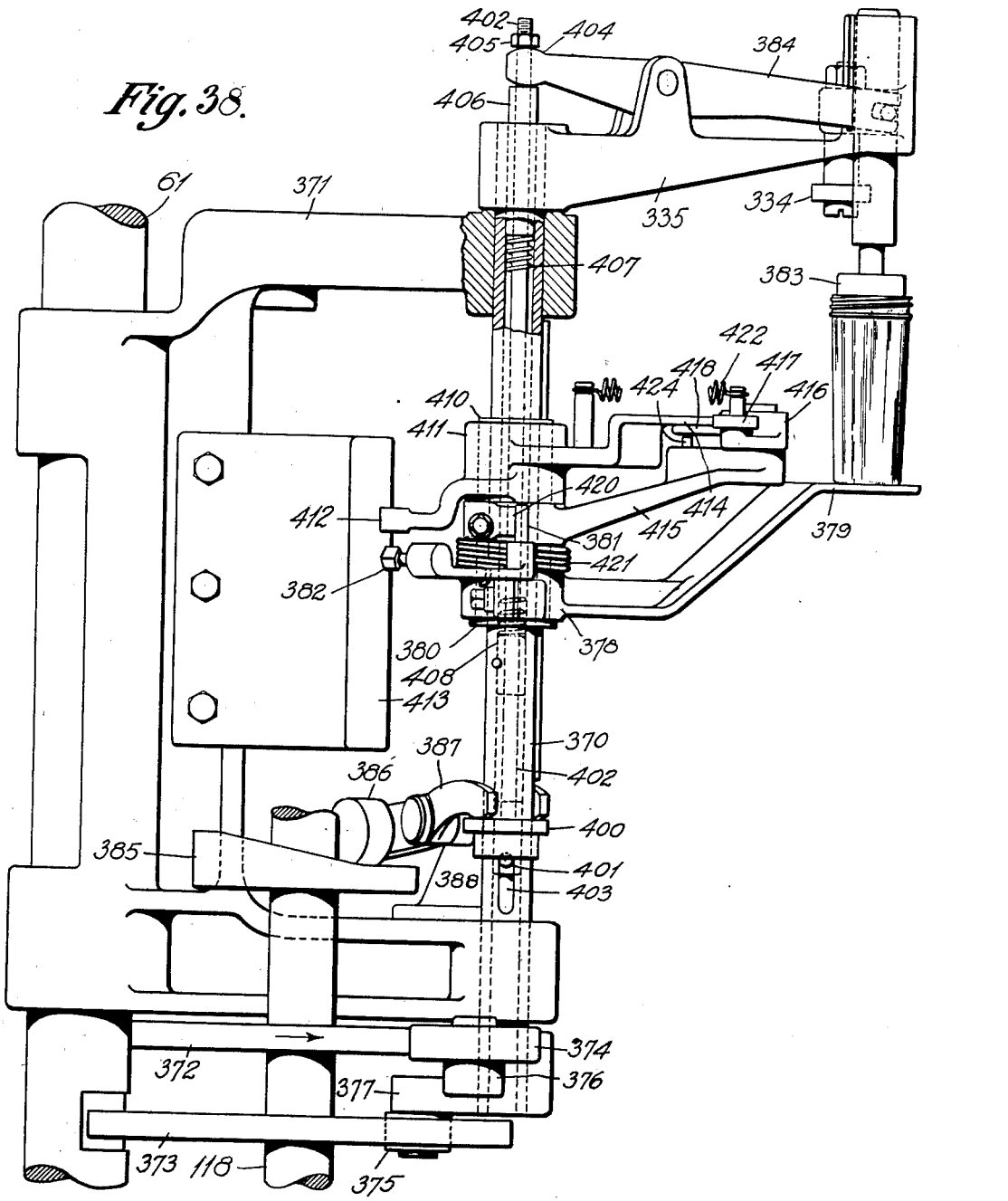

April 7, 1931.  E. H. LORENZ  1,800,191
APPARATUS FOR SHAPING GLASS
Filed June 14, 1922   21 Sheets-Sheet 17
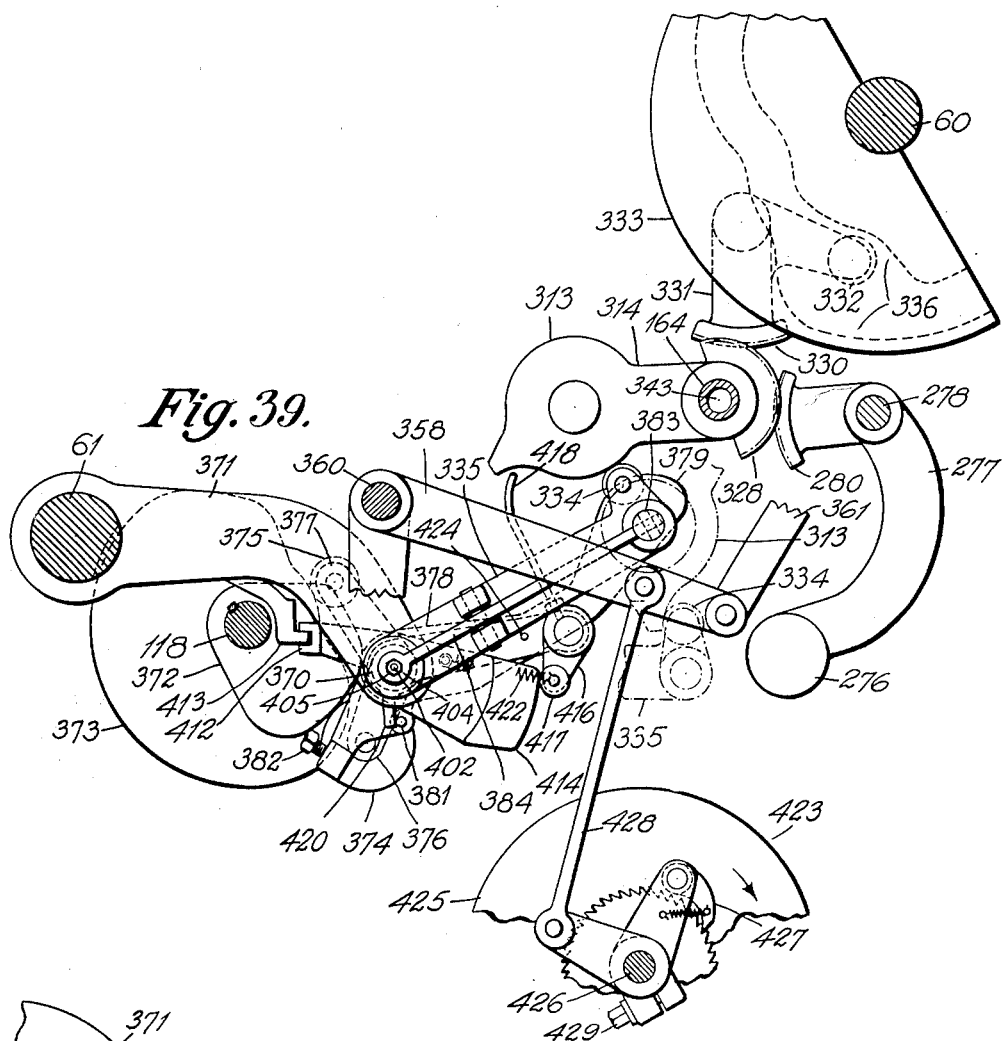
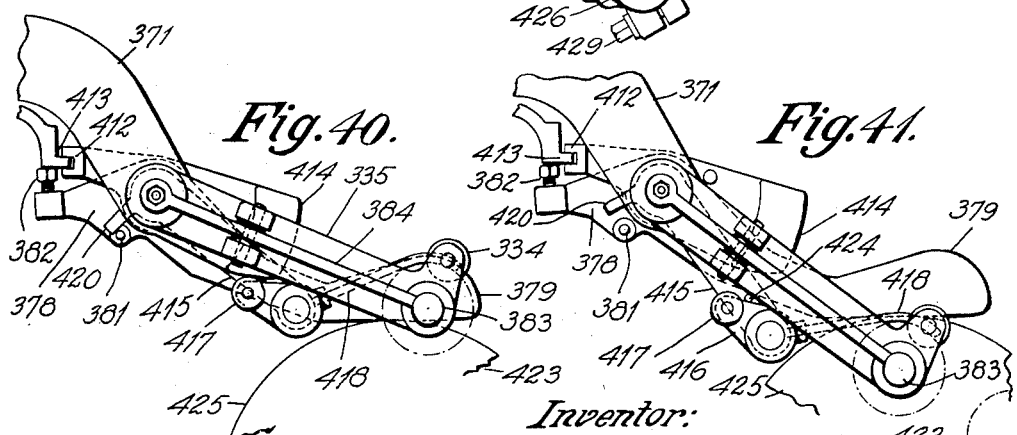
Inventor:
Edward H. Lorenz
by: W. H. Homiss Att'y.

April 7, 1931.  E. H. LORENZ  1,800,191
APPARATUS FOR SHAPING GLASS
Filed June 14, 1922   21 Sheets-Sheet 18

Inventor:
Edward H. Lorenz
by
Atty.

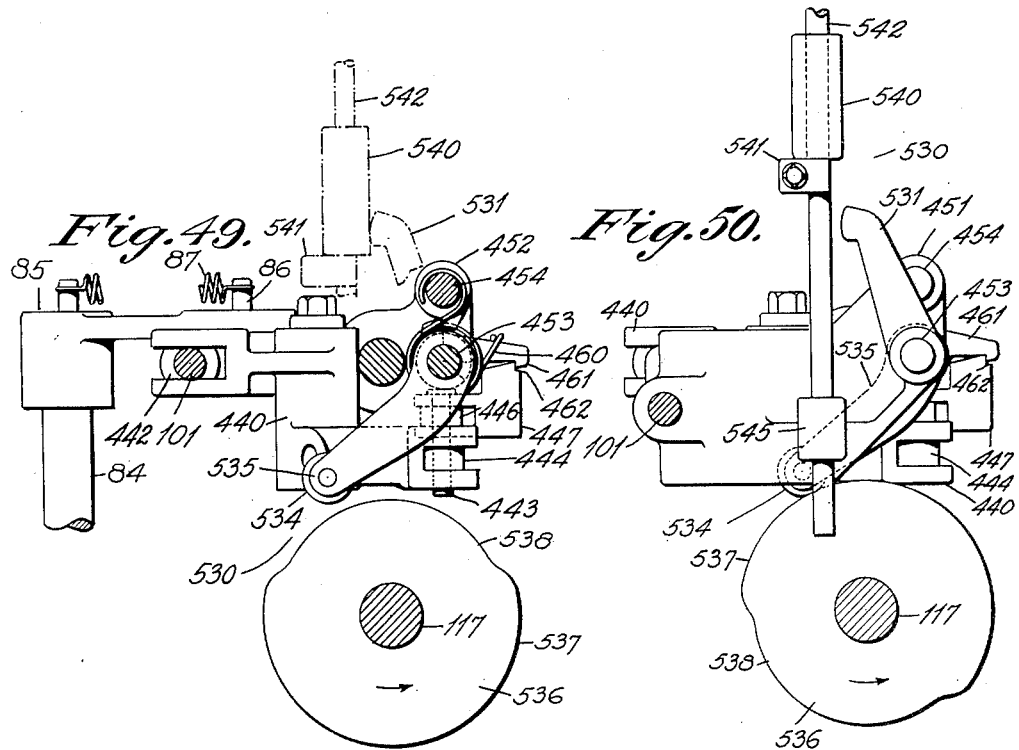
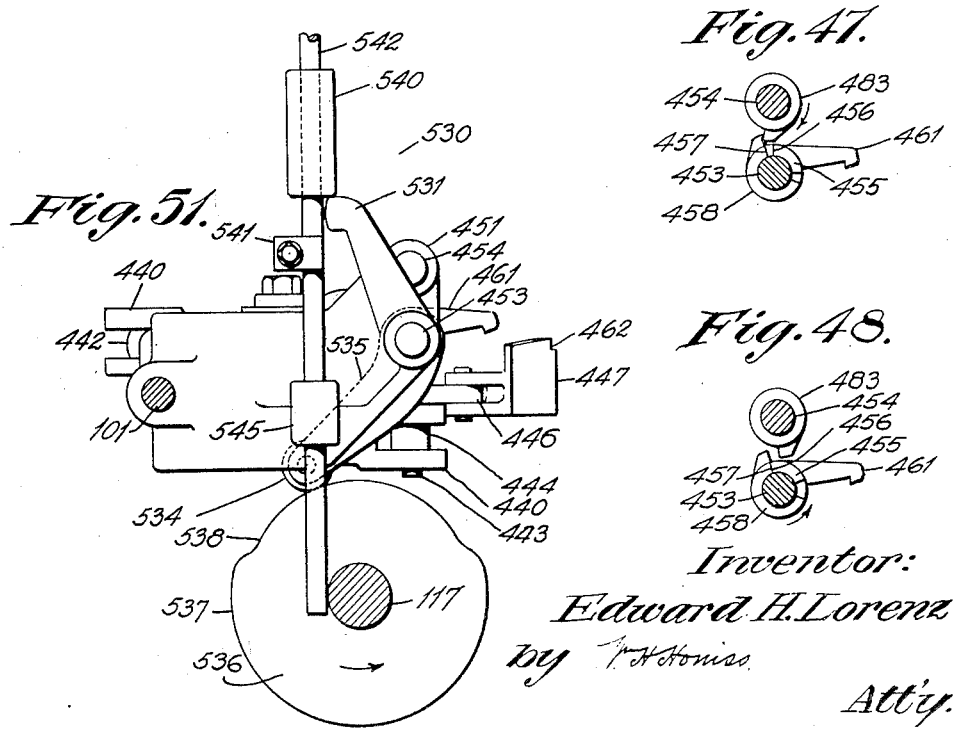

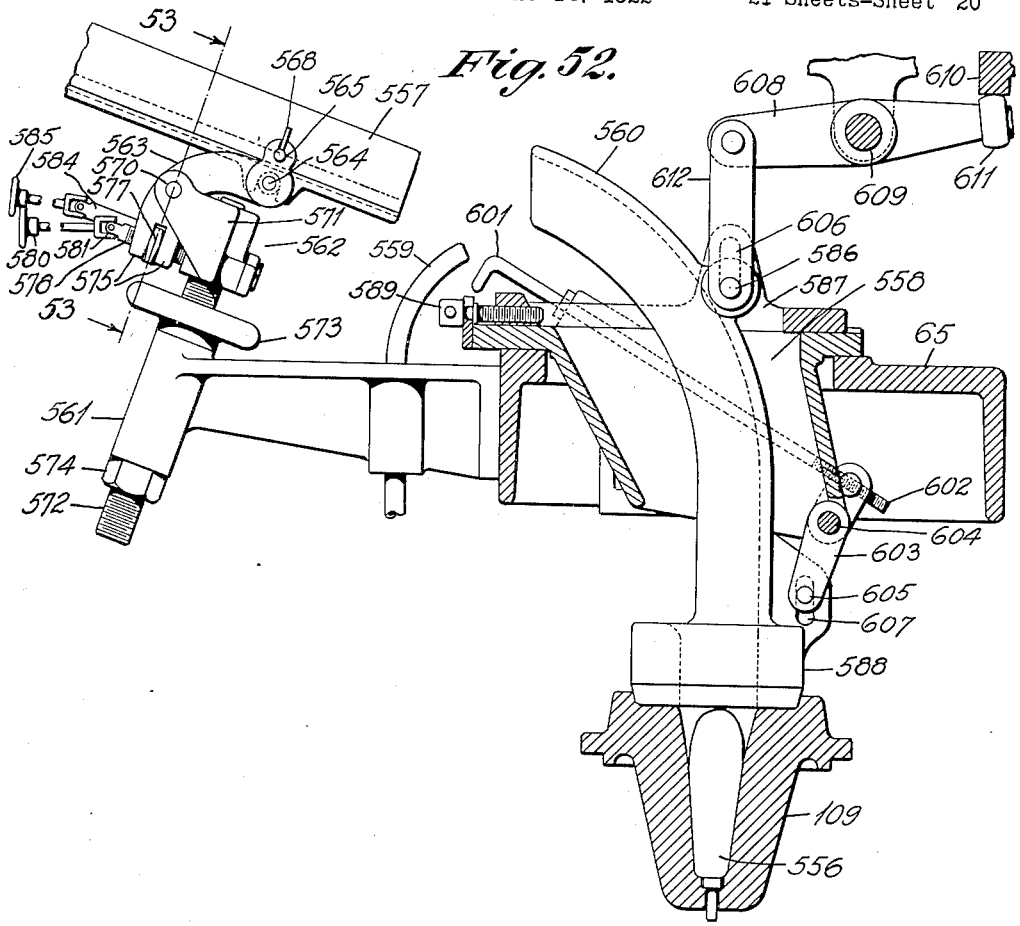
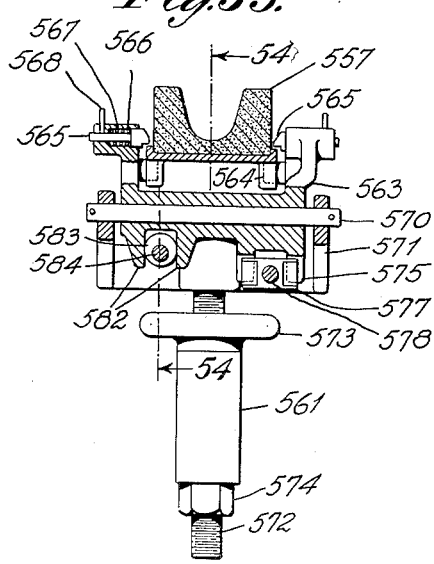
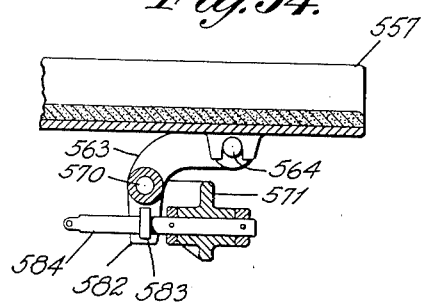

Inventor:
Edward H. Lorenz
by: *[signature]* Atty.

Patented Apr. 7, 1931

1,800,191

UNITED STATES PATENT OFFICE

EDWARD H. LORENZ, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

APPARATUS FOR SHAPING GLASS

Application filed June 14, 1922. Serial No. 568,134.

This invention relates to the art of shaping charges of molten glass into the desired forms of glassware.

One principal object of the present invention is to provide an organized machine for shaping these charges, as by pressing and blowing, and then delivering them to any suitable receiving or conveying mechanism, all of its operations being entirely automatic. In the embodiment of the invention illustrated herein, this object is attained by providing a plurality of glass shaping mechanisms arranged upon a plurality of intermittently rotating mold turrets or tables so that the molds on one turret are successively brought to charge receiving and pressing positions, and the mold charges are pressed to form blanks or parisons, the heads of which are pressed into neck rings carried by the other turret. This turret is successively moved to and stopped at a plurality of stations, during which time the blank mold is lowered away from the parison which is then surrounded and enclosed by a blow mold, blown therein to final form, and then discharged from the blow mold.

Further objects will be apparent from the following description, taken in connection with the accompanying drawings which show a preferred embodiment of the invention, and in which:

Fig. 2 is a top plan view of the machine;

Fig. 3 is a diagrammatic view showing the relation between the blank molds, blowing mechanisms and takeout just after the turrets have come to rest;

Fig. 4 is a horizontal section taken below the blow turret;

Fig. 5 is a vertical section taken through the machine on the line 5—5 of Fig. 2;

Figure 18:
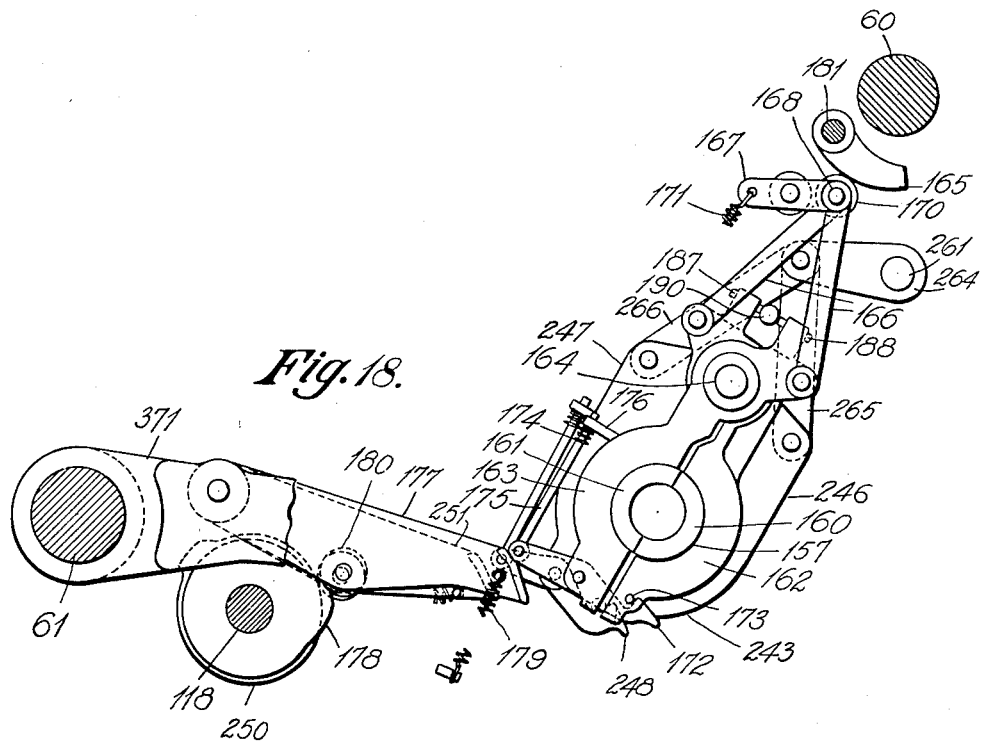
Figure 19:
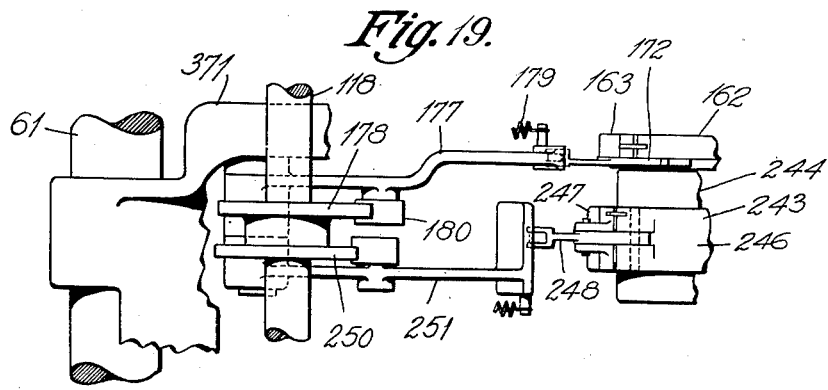
Figure 42:
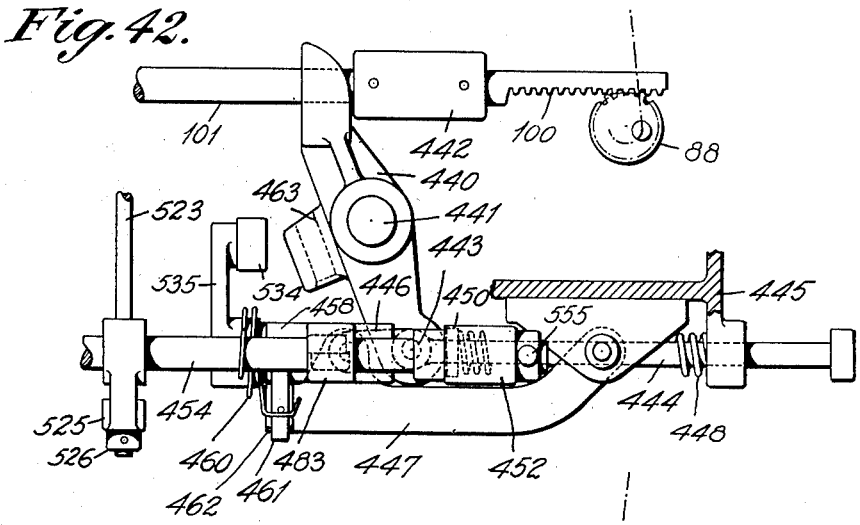
Figure 43:
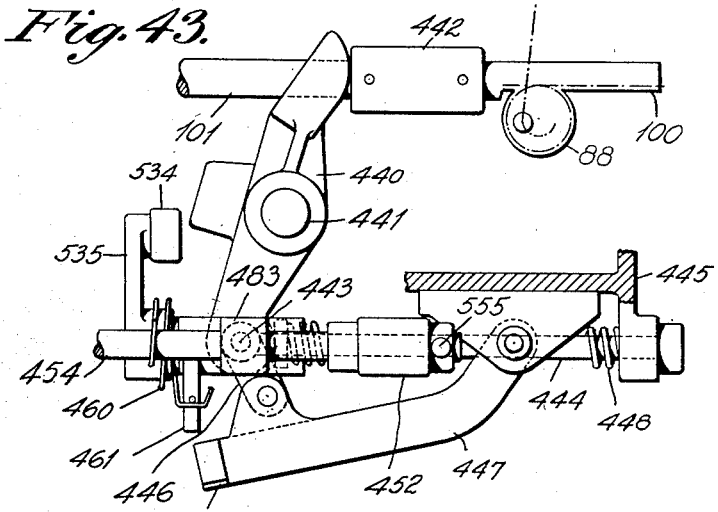
Figure 44:
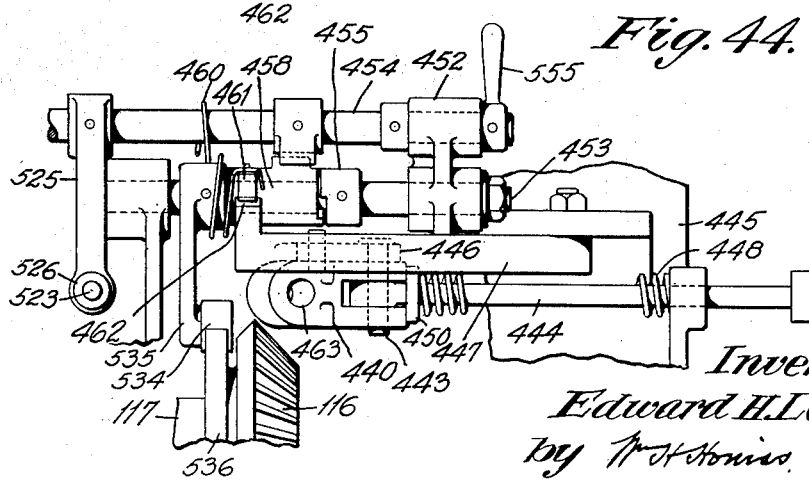
Figure 55:
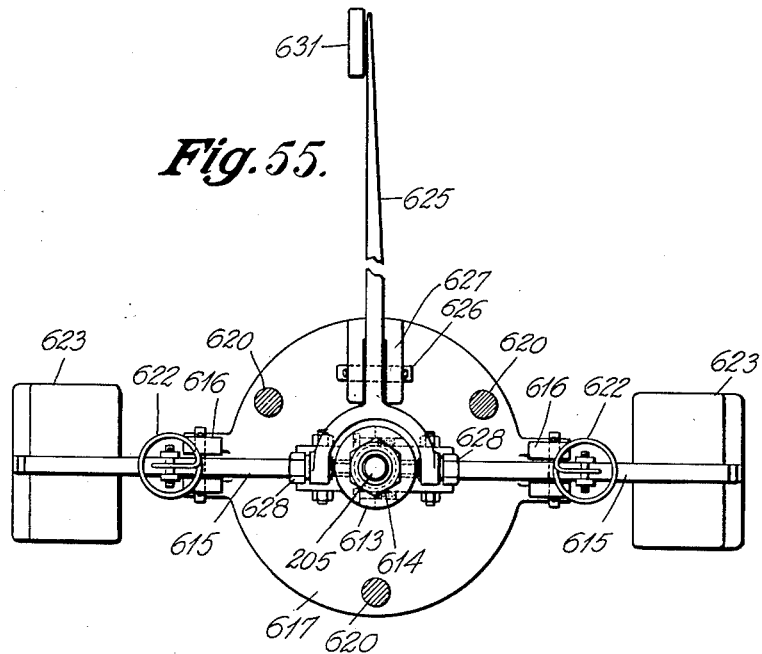
Figure 56:
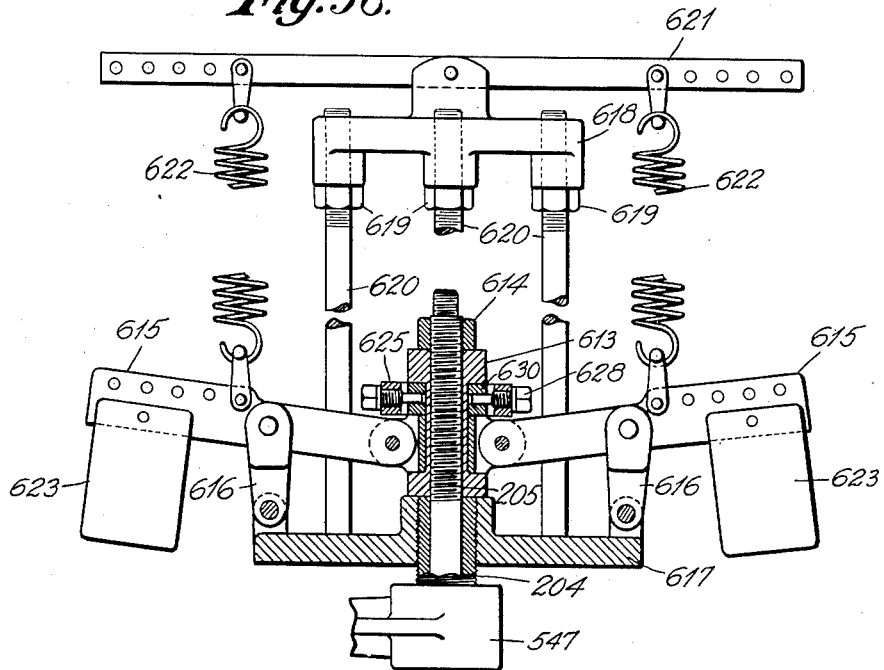

Figs. 6–8 are detail views of the clutch mechanism, Fig. 6 being a longitudinal vertical section on the lines 6—6 of Figs. 7 and 8, Fig. 7 being a partial plan showing the clutch mechanism in dotted lines, and Fig. 8 being a transverse vertical section on the line 8—8 of Fig. 6;

Fig. 9 is a detail, partly in vertical section, showing the plunger in engagement with the glass in a blank mold;

Fig. 10 is a sectional detail of the blowing mechanism;

Figs. 11–14 are details showing the primary means for elevating the blank molds, Fig. 11 being a side elevation partly in section of the blank mold turret and showing the blank mold cooling means, the locking means and the primary elevating means. Fig. 12 is a partial front elevation showing a slide in the same relation to the primary elevating means as in Fig. 11. Fig. 13 is a side elevation, partly in section, showing the mold and plunger in pressing relation. Fig. 14 is a side elevation, partly in section, showing the relation of the blank mold and neck ring just after pressing is completed;

Figs. 15–17 are details showing the auxiliary mold lifting means and anvil mechanism, Fig. 15 being a plan view and Figs. 16 and 17 being side elevations, Fig. 16 showing the lifting means in its lower position and Fig. 17 showing it in its raised position;

Figs. 18 and 19 are details of the neck ring and blow mold mechanisms including their latching and unlatching devices, Fig. 18 being a plan view and Fig. 19 a side elevation;

Fig. 20 is a plan view of the machine, with some parts removed, taken just below the upper tie;

Fig. 21 is a vertical section through the stripper plate mechanism showing the spring plate guide;

Figs. 22 and 23 are a side elevation and plan respectively, with parts in section, of the plunger controlling cam and plunger throwout;

Figs. 24–28 are detail views showing mechanism for opening and closing the blow molds and the safety trips associated therewith, Fig. 24 being a plan view, Fig. 25 a side elevation, Figs. 26 and 27 showing the mold opening trip in its set and released positions, Fig. 26 being a section on the line 26—26 of Fig. 24, and Fig. 28 being a front elevation of the mold opening trip mechanism;

Figs. 29 and 30 are detail views showing in sectional plan and side elevation the means for elevating the bottom plates and the means for insuring their lowering gradually;

Figs. 31–37 are diagrammatic views showing the operation of the dogs for opening and closing the blow valves under varying conditions, Figs. 31–34 showing what is happening at successive periods in the cycle of operations when the turret is moving at the time the valves are operated, while Figs. 35–37 show the mode of operating the valves when the turret is stationary;

Figs. 38–41 are detail views of the take-out mechanism with various parts broken away, Fig. 38 being a side elevation and Figs. 39–41 being plan views showing the position of the take-out mechanism at successive intervals of time;

Figs. 42–51 are detail views showing the safety trip mechanisms, Figs. 42 and 43 being plan views, and Fig. 44 a side elevation of the means for transmitting the tripping movement to the clutch, Fig. 42 showing the trip mechanism set, and Fig. 43 showing it released. Figs. 45 and 46 are front and side elevations of the overload release and main safety trip, certain parts being shown in section. Figs. 47 and 48 are diagrammatic details of the trip latch and its adjacent parts on the trip shafts. Figs. 49–51 are side elevational details of the plunger trip, Fig. 49 showing the parts in the relation they occupy when the plunger is raised, Fig. 50 showing their relation when the plunger is lowered into the glass in the normal operation of the machine, and Fig. 51 showing their relation when the trip is released;

Fig. 52 is a transverse vertical section through the lower tie showing the mechanism for adjusting and reciprocating the deflector and the mechanism for adjusting the lower end of the conduit; Fig. 53 is a transverse vertical section on the line 53—53 of Fig. 52; Fig. 54 is a longitudinal vertical section on the line 54—54 of Fig. 53; and Figs. 55–57 are details showing a weight counter-balance and an indicator for light and heavy charges with certain parts broken away, Fig. 55 being a plan view, Fig. 56 a front elevation partly in section, and Fig. 57 being a side elevation.

General description

With a view to making the later detailed description clearer, the particular embodiment of the invention shown herein and its manner of operation will first be described generally.

The machine comprises two turrets supported in a suitable framework, a blow turret for carrying blow molds, neck rings, bottom plates, blowheads, and their operating mechanisms, and a blank turret for carrying blank molds. The circular paths of these two sets of molds are tangential to each other, coinciding at the pressing station A.

For convenience in referring to the various stations, or stopping points of the blow turret, in the embodiment of the invention shown herein they have been designated as follows, referring to Figs. 2 and 3:

A represents the pressing station.
B represents the mold closing station.
C represents a blowing station.
D represents a blowing station.
E represents the valve closing station.
F represents the take-out station.

Power from any suitable outside source is transmitted through a worm shaft, near the bed, to a drum shaft, which intermittently rotates the blow turret, this rotary motion being transmitted to the blank turret through the intermeshing of gears on the two turrets. The drum shaft also actuates a horizontally extending cam shaft, and this in turn drives a vertical cam shaft.

In the embodiment herein shown, the mold charges pass into blank molds carried by vertically reciprocating slides on the blank turret. As the latter is revolved each slide is successively elevated by a fixed lifting cam, until it reaches the pressing station A, where it is directly below a plunger, whereupon an auxiliary mold lifting device elevates the blank mold still higher and at the same time locks the turrets against rotation, permitting an anvil to be thrown into position for supporting the blank mold during the pressing operation. Meanwhile a neck ring will have been brought over the blank mold by the rotation of the blow turret, after which the plunger is forced downward, preliminarily shaping a mold charge to form a parison and forcing the upper portion of it up into the neck ring (Fig. 9). The anvil is then pulled back, and the blank mold is lowered away from the neck ring by the auxiliary mold lifting device, leaving the parison hanging in the neck ring (Fig. 14). This unlocks the turrets or tables, which are then rotated another step, carrying these molds away from the pressing station.

This movement advances the neck ring and blow mold to station B, a bottom plate is swung into position and raised, and the blow mold closes around the neck ring, the blank suspended therefrom, and the bottom plate. A blowhead is brought into position above the neck ring, and at any suitable time a valve communicating therewith is opened by a cam to admit compressed air to blow the parison to final shape. At the desired time the cam closes the valve and, as the blow mold arrives at the takeout station F, the mold is opened, the bottom plate is lowered, and the blow head and bottom plate are swung out of the way.

At the same time a takeout device is swung inwardly, bringing a delivery plate into supporting position underneath the ware or article, a plug is lowered into the top of the article to steady it, the neck ring is opened to release the article, and the takeout is swung outwardly, gradually releasing a cam controlled delivery rod which, with the aid of the plug, wipes the article off onto a receiving table, from which it is removed and conveyed to an annealing lehr in any desired manner.

Framework

Figure 1:
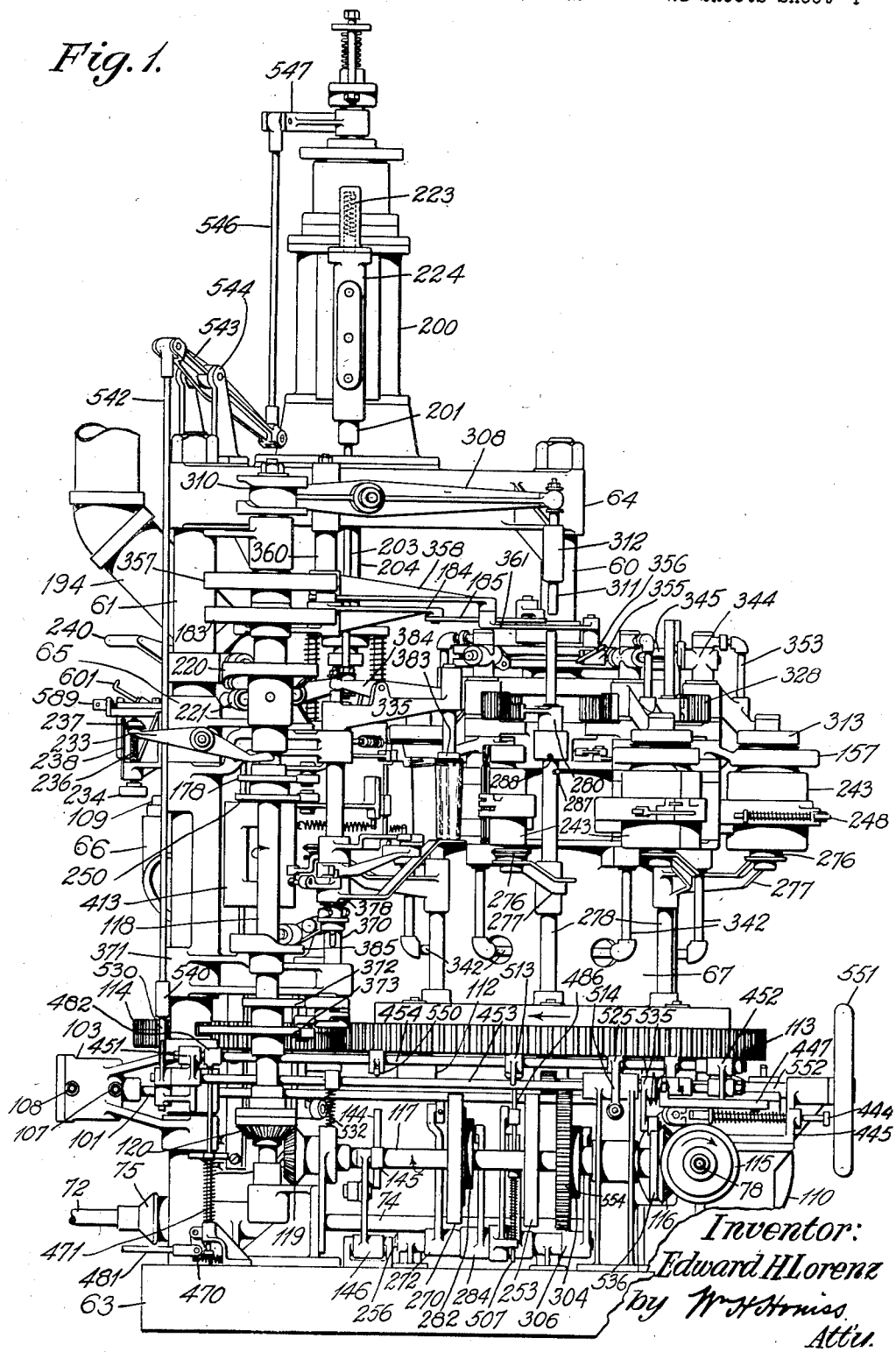
Figure 1 is a left side elevation of the machine with certain parts omitted for clearness.

The framework of the machine comprises three columns 60, 61, 62 secured in a bed 63, and connected by an upper tie 64, columns 61 and 62 being additionally secured together at a suitable intermediate point by a lower tie 65, (Figs. 1 and 2).

The two turrets for carrying the molds are the blank turret 66, and the blow turret 67, geared together and arranged for intermittent rotary motion, the former in suitable bearings in bed 63 and lower tie 65, and the latter on column 60 (Fig. 5), a suitable thrust bearing 68 being interposed between the blow turret and an auxiliary column 70 which surrounds the lower portion of column 60 and sustains the weight of the blow turret.

Although any desired number and style of blank molds and blow molds might be used, the embodiment of the invention shown herein is provided with 3 blank molds and 6 blow molds, there being a neck ring, bottom plate and blow head for each blow mold (Fig. 3). The 3-mold blank turret is revolved twice for each revolution of the 6-mold blow turret in order to provide a parison for each blow mold. As all the blowing mechanisms are alike, it will only be necessary to describe one of them, it being understood that each blowing mechanism is capable of turning out a completely formed article, each of which goes through the same series of operations, first through the pressing stage and then through the blowing stages.

Driving mechanism

Power to operate the machine is supplied from any suitable source to a sectional drive shaft 71, 72 through any convenient clutch, preferably provided with an overload release 73 (Figs. 45 and 46), the driven section 72 being connected with a worm shaft 74, near the bed of the machine, by a universal joint 75 (Fig. 1). At its inner end the worm shaft carries a worm 76 that meshes with and continuously rotates a worm wheel 77 loosely mounted on a drum shaft 78 (Fig. 6).

At the desired time, power is transmitted from the worm wheel 77 to the drum shaft through suitable clutch mechanism, comprising a driving member 80, secured to the worm wheel 77, and a driven member 81 slidably secured to a hub 82 of a drum 110 which is rigidly mounted on the drum shaft 78 (Fig. 6).

The driven clutch member 81, which is grooved, is engaged by the shoes 90 of a yoke 83, keyed to a shaft 84, the upper end of which is keyed to one end of a throwout arm 85 (Figs. 7 and 8). The other end of this arm is slotted to receive a shoe 86 that is pulled toward the shaft 84, by a spring 87, the shoe being eccentrically mounted on a throwout gear 88, surrounded by a suitable guard 89 carried by arm 85 (Figs. 7 and 8). To operate the clutch, gear 88 meshes with a rack 100 on a piston rod 101 (Figs. 42 and 43), which carries a piston 102 that operates in a cylinder 103 controlled by a three-way starting valve 104, through a handle 105, and supplied with compressed air from any convenient source, as through a pipe 106 (Fig. 4).

To start the machine with the connections arranged as shown herein, handle 105 is moved clockwise to admit air to the front of cylinder 103, through a pipe 107, thereby rotating gear 88 counter-clockwise, and effecting engagement of the clutch members to transmit motion to drum shaft 78. To stop the machine pneumatically, handle 105 is turned counter-clockwise admitting air to the rear of cylinder 103, through a pipe 108, and rotating gear 88 clockwise to throw the clutch members out of engagement. After being moved to start or stop the machine, handle 105 is immediately turned to the central or neutral position to cut off the air supply to cylinder 103 and leave both ends open to exhaust, thus leaving the clutch so it can be operated without having to overcome pressure on piston 102. This also leaves the handle 105 ready for operation in either direction.

The power thus supplied to the drum shaft 78 operates all the moving parts of the machine, except those operated by the plunger and blow head pistons, through a series of cam shafts, cams and intermeshing turret gears.

The drum shaft 78 carries two cams, the drum 110 and a mold lift cam 111, the latter operating mechanism to be described later, and the former rotating the blow turret 67 intermittently, stopping it at a plurality of stations, by successively actuating cam rolls 112 depending from the turret, there being as many rolls as there are stations, which is the same as the number of blow molds (Fig. 4). This rotation of the blow turret also drives the blank turret through ring gears 113 and 114 with which the turrets are connected (Fig. 1).

At one end the drum shaft carries a bevel gear 115 which meshes with a corresponding bevel gear 116 on a horizontal cam shaft 117 to rotate the latter, cam shaft 117 in turn driving a vertical cam shaft 118 through bevel gears 119 and 120 (Fig. 1), thus operating a series of cams that are carried by these shafts for purposes which will be explained later in connection with the mechanism they operate.

Pressing mechanism

The pressing mechanism comprises blank mold elevated means, an anvil mechanism, a locking mechanism, neck rings, plunger mechanism, a neck ring holder support, a spring plate guide, a scale indicator for plunger timing, a plunger throwout, and blank mold cooling means.

The blank mold elevating means includes blank molds, a fixed cam and an auxiliary mold lifting means. The blank turret 66 carries three blank molds 109, each of which is mounted for vertical reciprocation on a slide 121 (Fig. 11), provided with parallel fingers 122 and a roll 123, the latter engaging a fixed cam 124 surrounding the blank turret and secured to the bed 63. As the blank turret is rotated, the rolls 123 on the slides ride on cam 124 and are successively lifted to its highest point (Figs. 11 and 12), which position just precedes the pressing position. Here the contour of cam 124 preferably drops abruptly from its highest to its lowest point (Fig. 12), but by the rotation of the turret the parallel fingers on the slide will have been carried into engagement with a roll 125 on a mold lift arm 126 of an auxiliary lifting means, and the support of the slide will therefore have been transferred from cam 124 to arm 126 (Fig. 12).

The auxiliary lifting means (Figs. 15–17) comprises a horizontal shaft 127, secured in suitable bearings near the bed 63 and rocked by the mold lift cam 111 (Fig. 4), through its engagement with a roll 128 on a cam arm 129 on shaft 127. The mold lift arm 126 constitutes part of a special linkage for transmitting the rocking movements of shaft 127 to slides 121 successively to raise and lower them, and hence the molds 109, into and out of pressing position. The rear end of shaft 127 is housed in a bracket 130 secured to the bed 63. This bracket forms bearings for a yoke shaft 131 on which is pivoted a yoke 132 carrying a shaft 133 which supports the mold lift arm 126, the latter being connected to shaft 127 through a pair of links 134 pivoted to a link arm 135 that is rigidly secured to shaft 127 (Fig. 16).

Bracket 130 has a set screw 137 bearing against a lug 138 projecting downwardly from yoke 132 to limit the amount it can be lowered (Figs. 16 and 17).

During the first part of the auxiliary lifting operation yoke 132 is pulled downwardly toward the bed 63 by a pair of coiled springs 140, causing arm 126 to pivot on shaft 133 (Fig. 16), and lift one of the slides 121 when cam 111 moves cam arm 129 clockwise, but during the last part of the lifting operation, when a slide reaches any obstruction, as the wedge stop pointed out later, the continued motion of cam 111 shifts the fulcrum of arm 126 to its other end, where it bears on the slide. Any further movement of arm 126 will lift pivot 133 and yoke 132, consequently extending springs 140 and withdrawing lug 138 from contact with set screw 137 (Fig. 17). At this time an anvil 142, to be described later, is thrown into position under arm 126. Owing to its being suitably relieved, cam 111 then slightly releases its pressure on cam arm 129 so that springs 140 pull downwardly on arm 126 and yoke 132, tending to straighten the toggle formed between the end of arm 126 and the anvil 142, the lines of the toggle being indicated by dot and dash lines 139 and 149 (Fig. 17). This forces the anvil slightly outward and holds the slide more solidly to its seat, thereby providing a rigid resistance for the downward pressing thrust of the plunger, which is about to take place in the direction indicated by an arrow 136 in the manner described below. The relief of cam 111 allows the slide to be supported entirely by anvil 142 during pressing, and thereby prevents any slight irregularities or vibrations of the cam motion from being transmitted to the mold.

To compensate for possible differences in the heights of the slides, the top of the anvil and the bottom of the mold lift arm are beveled and are moved through different arcs, thus permitting them to be thrown into contact at varying heights. As the contact points come substantially under the center of the mold, there is no tendency for the pressing stroke to tip the slides. Furthermore, roll 125 is so mounted on arm 126 that as the latter rises to pressing position, the end of the arm comes in contact with the upper finger 122 and takes the pressure off the roll (Fig. 17). Hence the pressing thrust is received by a direct line of parts rather than by the stud of the roll.

These operations will have lifted a slide and blank mold to the position shown in Figs. 13 and 17, and after the pressing has been completed, the further rotation of cam 111 will lower arm 126 and the slide with which it is in engagement until roll 123 rests on the low part of cam 124 (Fig. 14) and is ready to be revolved by the blank turret. This will leave the pressed glass or parison 158 hanging in a neck ring (Fig. 14) to be described later.

Better to adapt the machine for making ware of widely differing lengths, the cam 124 may be provided with a removable plate 141, as shown in Fig. 11.

To take the thrust of the pressing operation, there is provided the anvil referred to above and its operating mechanism. The anvil 142 is pivoted on a stud shaft 143, and its operating means comprises a cam 144, on cam shaft 117, which bears against a roll 145 on a cam arm 146 pivoted on a stud shaft 147, and operates the anvil through a connecting rod 148 and a coiled spring 150 sleeved thereon (Figs. 15 and 16). When the cam pulls the anvil out of engagement with the mold lift arm, the spring is compressed against a bracket 151. This compression throws the anvil back into engagement with the mold lift arm when roll 145 is released by cam 144. In the preferred embodiment of the invention, the anvil is therefore withdrawn by positive means and applied by a yielding means, thus avoiding breakage should the mold lift arm 126, or some other part, be out of position when the anvil is positioned.

To prevent turning of the turrets during pressing, each slide 121 carries a locking wedge 152, which is positioned behind a wedge stop 153, secured to the lower tie, when the slide is elevated into pressing position by arm 126 (Figs. 9 and 13). This locks the turrets, and also limits the height to which the slides can be lifted. When pressing is completed and the slide is lowered, the locking wedge is thereby disengaged from the wedge stop, unlocking the turrets (Fig. 11).

To secure the desired contact between the locking wedges and the stop, the former are made adjustable. The bottom of each locking wedge 152 is also made wedge shaped to cooperate with an adjusting wedge 154 (Figs. 9 and 11) disposed between it and the top of the slide, the relative positions of these wedges being regulated by an adjusting screw 155, carried by a projecting flange on the adjusting wedge. Any convenient means may be utilized for holding the wedges in adjusted position, as by securing them to the slide with one or more screws 156 (Fig. 11).

The neck rings 157, one for each blow mold, form the upper portions of the parisons 158, and support the parisons and the finished articles. The neck rings are formed in half sections 160 and 161 (Fig. 18), carried in holders 162 and 163 that are pivoted on mold hinge pins 164 on the blow turret 67 and are successively operated by a finger cam 165, through links 166 secured at one end to the holders 162, 163, and at the other end to a lever 167 by a pin 168 which also carries a cam roll 170. Each of these levers is pivoted to turret 67 and its cam roll is held in position for engagement with the finger cam by a neck ring spring 171 which is secured to any convenient part of the blow turret. When the cam is actuated, as described later, the roll is pushed outward, opening the neck ring sections and distending the spring 171.

To insure the holders remaining closed, so as to avoid varying the contact between the glass and the neck ring, which might cause strains in the ware, and to prevent the neck ring from yielding under the blowing pressure, a latch 172 is pivoted to each holder 163 and a latch pin 173 is secured to each holder 162, the latch being normally held in contact with its pin by a latch spring 174, which is sleeved on a latch rod 175 (Fig. 18). One end of the latter is secured to the rear end of the latch, and its other end passes loosely through a lug 176 on holder 163.

To open a neck ring, spring 174 is compressed by a lever 177, pivoted to any convenient part of the machine and operated by a cam 178, on cam shaft 118, with which cam it is held in contact by a spring 179, the cam engaging a roll 180 on the lever and forcing the latch 172 to release latch pin 173 at the desired time (Figs. 18 and 19). Immediately thereafter the neck ring is opened by finger cam 165, which is rigidly mounted on a shaft 181, pivoted in a suitable bracket 182 secured to column 60 (Figs. 5 and 20), and is operated by a cam 183 on shaft 118, through suitable linkage, comprising a bell crank lever 184, mounted on a pivot 360 on upper tie 64, and links 185 and 186, the latter being rigidly secured to shaft 181.

Each neck ring is closed by its spring 171 (Fig. 18) which will have been placed under sufficient tension, by the opening operation, to effect the closing when the neck ring is released by finger cam 165. Meanwhile lever 177 will have released latch 172, and spring 174 will now snap the latch over pin 173 and hold the neck ring closed until lever 177 again releases the latch.

For properly aligning the neck ring sections with the blowing mechanisms, each pair of neck ring holders 162, 163 carries alignment screws 187, 188, respectively, which abut against a centralizing pin 190 (Fig. 18) secured to the blow turret (Fig. 5). By adjusting these screws in opposite directions the center line of the neck rings may be shifted laterally.

The plunger mechanism for converting the mold charges into parisons includes a double acting cylinder 200 (Fig. 1), controlled by a slide valve 201 through a valve rod 203, all of which are or may be of any well known type of construction.

However, in the preferred embodiment of the invention, a hollow piston rod 204 surrounds a plunger rod 205 which carries a plunger 206 at its lower end (Figs. 9 and 21). The plunger may be cooled in any well-known way, either by steam or compressed air, but as that is no part of the present invention, it will not be described herein. The stripper plate mechanism comprises a stripper plate 207, hung from a stripper spring plate 208 by stripper studs 210, on which are sleeved springs 211. At their lower ends the studs are preferably threaded into the stripper plate, and at their upper ends they are provided with nuts 202, to prevent their slipping through the stripper spring plate 208 and for another purpose to be described later. The stripper spring plate is rigidly but adjustably secured to the piston rod and the stripper plate carries a removable plunger ring 212 which loosely surrounds the plunger. The latter has a projection 213 which centers the plunger ring on the plunger and thereby avoids wear at a glass sealing joint 209. In forming a parison, the descent of the plunger carries the plunger ring into contact with and closes the end of a neck ring 157, after which the further descent of the plunger forces the glass side-wise and upward into the neck ring and forms the upper portion of the finished article (Fig. 9).

The anvil mechanism for taking the thrust of this pressing operation has already been described, and the means for supporting the outer portions of the neck ring holders 162, 163, when necessary will now be explained. As these holders are revolved by the blow turret, they are successively carried into a support or guideway 214 (Fig. 9), formed on the wedge stop 153, and stopped in that position for the pressing operation, a sufficient clearance being provided between the support and the neck ring holders to allow for possible differences in the heights of the slides 121. The neck ring holders will thus be positively held against upward or downward displacement in case of abnormal operation, such as glass getting between the blank mold and neck ring, or the descent of the plunger without a blank mold being in place underneath.

In Fig. 21 is shown a means for enabling the plunger and ring to center themselves in the neck ring without danger of binding between them. The neck rings 157 have inclined inner surfaces 215 which engage the descending plunger ring 212 if it is out of alignment with the neck ring, and shift it, and hence the plunger 206, sidewise in a clearance 216 provided between the plunger ring 212 and the stripper plate 207. The resulting tendency to tip the plunger ring and the stripper spring plate 208 out of square with the plunger is prevented by providing one or more of the orifices in the spring plate, through which studs 210 pass, with an aligning hub or guide 217. This alignment is facilitated by tying together two or more of the stripper studs, preferably near their upper portions, with a tie plate 218 that is secured to the studs 210 by any suitable means, as by holding it against shoulders 219 on the studs 210 by means of nuts 202 (Fig. 21). If not prevented this binding may cause variation in the pressure exerted on the glass.

It is frequently necessary to change the length of time the plunger dwells in the parison, and to do this while the apparatus is in operation, also to determine in advance how much change of the adjusting mechanism is required to secure a desired length of dwell. Therefore, a definite scale indicator is provided, so that by turning a handwheel a given amount, the change of dwell can be visibly and accurately predetermined, and this is accomplished as follows:

The admission of operating pressure fluid to the plunger cylinder 200 is controlled by the slide valve 201 through the valve rod 203 (Figs. 1 and 23), the latter being raised by a cam 220 (Fig. 22) on shaft 118, which engages a roll 221 on a lever 222 that is secured to the rod and pivoted to a convenient part of the machine. The valve rod is lowered by a spring 223 (Fig. 1) in a slide valve casing 224. Cam 220 is made of three parts— a fixed member 225 secured to shaft 118, a rotary member 226 adjustably secured to the fixed member by one or more bolts 227 which operate in suitable slots in these members and a sliding member or quill 228 (Fig. 22). A hub 231 of rotary member 226 carries two rolls 232 on its inner portion for engagement with the quill 228 (Fig. 22), which is so shaped that when the latter is raised or lowered it will shift rotary member 226 and vary the contour 230 of cam 220, and hence the length of the period of plunger dwell.

To raise and lower the quill and visibly indicate the direction and extent thereof to the operator, a lever 233 is pivoted to lower tie 65 and operated by a hand wheel 234 on a screw 236, which is mounted in a bracket 235 on the lower tie (Figs. 1 and 23). Screw 236 has a collar 237 for exerting a pressure on one end of lever 233, the opposite end of which is forked and partially surrounds shaft 118 just below quill 228. Secured to bracket 235 is a timing scale 238 (Fig. 1) in close proximity to collar 237, hence the exact amount hand wheel 234 is turned is indicated on the scale. Since the same amount of turning hand wheel 234 always effects the same change in the shape of cam 220, the operator can determine in advance how long a dwell period will result from a given turn of the hand wheel.

It is often desirable to operate the plunger by hand, or to stop its operation without stopping the operation of the other parts, as when starting up the machine, and this is accomplished, in the preferred embodiment of the invention, by a hand operated lever 240 pivoted in a bracket 241 secured on column 61 (Fig. 23). This lever terminates in a latch 242 (Figs. 22 and 23), which is lowered by raising the handle, thereby depressing lever 222 and holding the slide valve up against the pressure of spring 223. This keeps the plunger in its raised position until hand lever 240 is lowered.

The blank molds are provided with a simple and efficient cooling means which consists in leading a supply of cooling fluid to and around the blank molds. For this purpose the blank turret 66 has a series of cavities 191 (Fig. 11) and a series of outlets 192 one for each slide 121, the latter being provided with cavities 193 which register with the outlets 192 and also extend around the blank molds 109. The cooling fluid, which is preferably blower air, is conducted into the turret cavities 191 through a blower tube 194, supplied with a cooling fluid from any suitable source, and a funnel 195 (Figs. 11 and 20) secured to lower tie 65. The air then passes through outlets 192 into the cavities 193 and circulates around the blank molds 109, passing out into the atmosphere through outlets 196 in the slides. To control the amount of cooling fluid which is thus supplied to the molds, there are provided one or more vanes 197 (Figs. 11 and 20) mounted on pivots 198 whose outer portions carry indicators 199 of any suitable type for showing the amount the vanes are opened.

*Blowing mechanism*

A mold charge having been pressed as described above, with the parts in the position shown in Fig. 13, the plunger rises and the blank mold 109 is lowered by the mold lift arm 126, leaving the parison 158 hanging in the neck ring 157 (Fig. 14), ready for transfer to a blow mold 243 for the blowing operation.

Six blow molds 243 are shown, each being formed in sections 244, 245 (Figs. 19 and 10), carried by suitable holders 246, 247, (Figs. 18 and 19), which are mounted on the mold hinge pins 164 and are provided with latch mechanisms 248 similar to those for the neck rings 157. These mechanisms are unlatched by a cam 250 on shaft 118, through a lever 251 pivoted to any convenient part of the machine (Figs. 18 and 19), the construction and operation being similar to that described above for the unlatching of the neck rings.

The mechanism for opening the molds comprises a cam 253 on shaft 117 which actuates a roll 254 on a cam arm 255 that is pivoted on a rock shaft 256, and through a connecting rod 257 this operates a mold opening cam segment 258 pivoted to a bracket 260 on auxiliary column 70 (Figs. 24, 25 and 26). To transmit this motion to the mold holders 246, 247 there are provided six mold shafts 261. Each of these is mounted in bearings in turret 67 and at its lower portion rigidly carries a cam arm 262, on the outer end of which is mounted a roll 263 for engagement with the mold opening segment 258, and to the upper end of each mold shaft is rigidly secured a link arm 264, which is connected to the mold holders by a pair of links 265, 266 (Figs. 18, 24 and 25).

When a mold is closed its cam arm 262 is adjacent the blow turret axis, column 60, traversing the curved path indicated by dot and dash lines at the left and top of Fig. 24, and the rotation of the blow turret brings its roll 263 into the mold opening segment 258, which at this time is also adjacent the blow turret axis. Cam 253 then throws connecting rod 257 inwardly, swinging the mold opening segment outwardly and causing roll 263 to describe the irregular path indicated by dot and dash lines at the top of Fig. 24, until the mold opening segment is in effect a continuation of a cam slot 267 also carried by bracket 260. This rotates mold shaft 261 and swings link arm 264 inwardly, opening the mold, which is then held open while roll 263 traverses cam slot 267.

To close the mold, a somewhat similar, but reversed, mechanism is utilized, comprising a mold closing cam segment 268 (Figs. 24 and 25) so pivoted to bracket 260 that in its outer position it forms a continuation of cam slot 267. It is actuated by a cam 270, on shaft 117, which engages a roll 271 on a cam arm 272 pivoted to rock shaft 256, and connected to arm 269 of segment 268 by a connecting rod 273 on which is sleeved a spring 274. An auxiliary spring 275 secured to any convenient part of the machine, is also attached to the outer end of the segment to supplement spring 274.

When the roll 263 passes out of the cam slot 267 into the mold closing segment 268, the latter is swung inwardly toward the axis of the blow turret (Fig. 24) by the cam 270, thus turning mold shaft 261 and closing the mold sections, the approximate path of roller 263 on cam arm 262 being indicated by dot and dash lines, near the bottom of Fig. 24.

To shape the bottom of the ware properly, and also form a suitable closure for the blow molds, each of the latter has a bottom plate 276, mounted on an arm 277, secured to a bottom plate shaft 278 that is loosely carried in suitable bearings in turret 67 (Figs. 1 and 5).

To align the bottom plates with the molds for a blowing operation, and swing them out of the way thereafter, each shaft 278 also has a sector gear 280 (Figs 2, 20 and 39) rigidly secured thereto for engagement with a corresponding sector gear as described later.

To enable the bottom plates to swing freely without striking the blow molds, the shafts 278 are also reciprocable vertically, permitting the bottom plates to be swung horizontally in a plane below the blow molds and then shifted vertically into and out of their seats in the blow molds.

To thus lift the bottom plates there is provided a bell crank lever 281, pivoted to bracket 260 and actuated by a cam 282, on shaft 117, which engages a roll 283 on a cam arm 284 pivoted to rock shaft 256, this motion being transmitted to lever 281 through a connecting rod 285 (Figs. 29 and 30). A spring 286 attached to the upper end of lever 281, and secured to any convenient part of the machine, holds the roll against the cam, which is so timed that its low part will be adjacent to the roll at the time shaft 278 is rotated into position for lifting. This will insure lever 281 being in its lowest position ready to receive the end of shaft 278, and when cam 282 throws connecting rod 285 inwardly, shaft 278 will be lifted to bring the bottom plate into position for cooperation with its blow mold.

To guide the bottom plate as it is lifted, and prevent side-swing while lifted, shaft 278 is provided with any convenient aligning means, such as a pin 287 (Figs. 1 and 5), which engages a recess 288 in the blow turret 67.

When a bottom plate has been swung into position and lifted, it is locked in position by the closing of a blow mold 243 therearound, the latter being grooved as at 300 (Fig. 5) to receive the rim of the bottom plate, hence when the blow turret is rotated and moves shaft 278 away from lifting or supporting lever 281, the bottom plate is supported in its raised position by the blow mold.

When a finished article arrives at the take-out station F, the mold is opened, releasing the bottom plate 276 which is prevented from dropping suddenly under its own weight by providing below it at this point a lever 301, which is pivoted on bracket 260 and has an extended arm 302, that is normally pulled outwardly by a spring 303, attached to arm 302 and to any convenient part of the machine. This holds lever 301 up and thus temporarily supports the bottom plate shaft 278 in its upper position. Shaft 278 is then permitted to lower gradually by a cam 304 on shaft 117 which actuates a roll 305 on a cam arm 306, pivoted on rock shaft 256, and, through a connecting rod 307, transmits this motion to lever 301, to gradually overcome the pressure of spring 303 and lower lever 301 and shaft 278 (Figs. 29 and 30).

To lower the bottom plate, if it should fail to drop by gravity, a tap lever 308, pivoted to upper tie 64, is raised and lowered for each partial rotation of the blow turret by a cam 310 on shaft 118, the opposite end of lever 308 actuating a tap rod 311 which is housed in a bracket 312 secured to the upper tie (Fig. 1). The operation is so timed that a bottom plate shaft 278 will normally lower by gravity immediately before the tap rod 311 is lowered, but if it fails to do so, the down stroke of the tap rod will lower it.

The air for blowing the parisons 158 to final shape enters the blow molds through blowheads 313, one for each mold, mounted on the mold hinge pins 164 (Fig. 10). Each blowhead comprises an arm 314, provided with a chamber 315, in which is housed a piston 316, supported on an enlarged head 318 of a piston rod 317, which also carries a depending plate 320 that has a slight tilting motion for forming a tight closure for the top of the neck ring. The opposite end of the piston rod has a bushing 321 that operates in a recessed portion 322 of the blowhead arm against a spring 323 which is sleeved on the piston rod and at its opposite end bears against the bottom of recess 322. A pin 324, which passes through the piston rod above the bushing, retains the piston rod in the arm 314.

Blowing air enters each blowhead 313 through a passage 325 in arm 314 and passes into chamber 315 from which it escapes into the atmosphere through one or more openings 326 in the piston that communicate with one or more openings 327 in piston rod 317. Owing to the restricted area of these openings, air enters chamber 315 faster than it can escape, lowering piston 316 and seating plate 320 firmly on a neck ring 157, whereupon the air passes into the neck ring and blows the parison 158 to final shape in its blow mold 243.

When the air pressure ceases, as described later, spring 323 raises piston rod 317 and hence piston 316 and plate 320.

To position the blowheads into and out of alignment with the blow molds, each blowhead arm has a sector gear 328 which meshes with and is actuated by a sector gear 330 on a bell crank lever 331, this motion being transmitted to the bottom plate shaft by the engagement of sector gear 328 with sector gear 280 (Figs. 2, 20 and 39). There are six bell crank levers 331, one for each mold, pivotally carried on the blow turret, and each having a roll 332 which engages a fixed cam 333 on column 60, so that the rotation of the blow turret swings both the blowheads and bottom plates. These parts are so timed that they are swung into alignment with the molds at any convenient time, which is herein shown as the mold closing station B.

As shown in the present embodiment of the invention, the blowheads are not swung out of the way until after the turret has come to rest at the take-out station F, and some means other than that described above is therefore desirable in order to swing them out of the way. This preferably comprises a roll 334 (Figs. 20, 38 and 39), carried by a take-out plug bracket 335, which is swung toward the turret, as described in detail later, swinging the blowhead 313 clockwise out of the way of the take-out apparatus and rotating one of the levers 331 counter-clockwise, thus forcing its roll 332 inwardly, in an enlargement 336 of cam 333 (Fig. 39).

The blowing air, from any suitable source, enters the machine through a pipe 337 (Fig. 5) and passes into a chamber 338 between column 60 and auxiliary column 70, from which it escapes through an opening 340 in the latter into a recess 341 formed in the hub of turrent 67. From here it passes out into six sets of piping 342, which lead to the bottoms of the mold hinge pins 164, and communicate with openings 343 therein in which it remains until blow valves 344 (Figs. 5, 10 and 20), mounted on the tops of the mold hinge pins, are successively opened by an oscillating cam 345, on column 60.

Each blow valve 344 (Figs. 5 and 10) comprises a casing 346 having a valve plug 347 from which projects a pin 348, that is actuated as described below to position a transverse opening 350 in the valve plug into and out of register with an opening 351 in the bottom of the casing, that communicates with the opening 343 in the mold hinge pin, and an opening 352 in the top of the casing, that communicates with the blowhead through suitable piping 353 (Fig. 10).

To open each of the valve successively and then close them when it is desired to stop blowing, oscillating cam 345 has two or more adjustable dogs 354 and 355 (Figs. 2, 3 and 20), which may be of any desired form, but are herein shown as having inclined operating surfaces 356 (Fig. 1) for engaging under and over the pins 348, and thus raising and lowering them to open and close the valves 344 when cam 345 is oscillated. This is accomplished by a cam 357 on shaft 118 through a bell crank lever 358, mounted on the pivot 360 on upper tie 64, and a link 361 connecting lever 358 with cam 345, a slot 362 being provided in the latter to accommodate shaft 181 during the oscillation of the cam (Fig. 20).

In blowing glassware automatically, the adaptability and general utility of a machine is largely dependent upon the limits within which the occurrence and duration of blowing can be controlled, and in the present invention means are provided for starting and stopping the blowing at any desired time, regardless of whether the turret 67 is then moving or stationary.

The oscillations of the cam 345 (Fig. 20) are so controlled that there is preferably at all times relative movement between the cam and turret 67. While the turret is turning from station to station, the cam preferably turns in the same direction, but at a slower speed. When the turret slows and stops at its stations, the cam slows and reverses its movement, turning backwardly until the turret again starts forward, when the cam again reverses its movement and follows the turret at the slower rate as before. This maintenance of a differential between the movements of the cam and the turret enables the dogs 354 and 355 on the cam 345 to open and close the blow valves 344 at any desired time.

In Figs. 31-37 the operation of the dogs 354 and 355 is shown diagrammatically, disclosing what is happening at each station during the successive movements of the dogs and turret, Figs. 31-34 showing the resultant operation of the blow valves when the turret is moving and Figs. 35-37 showing their operation when the turret is stationary.

In these figures the larger circles $a$, $b$, $c$, $d$, $e$ and $f$ designate the blow valves 344 and the smaller circles designate the pins 348, whereas the inclined parallel lines indicate the dogs 354, 355 of the cam 345. The plain arrows applied to the dogs 354, 355, indicate the directions in which the dogs move in the respective views. The shaded arrows in Figs. 32, 33 and 37 indicate that in those views the turret 67 is moving, such movement always being in a clockwise direction. The successive stations are designated by the intersections of the ordinates with the abscissa, and are reached in the order indicated by reading from right to left. The abscissas indicate the paths of the valves. When a pin 348 is below the abscissa the valve is closed, but when a pin is above the abscissa the valve is open.

In Fig. 31 the turret is beginning its clockwise movement, the dogs 354, 355 are moving counterclockwise but are about to reverse their movement, and the valve $a$ is closed at the press station A. At the mold closing station B, the valve $b$ is about to be opened. At the blowing stations C and D, and the valve closing station E, the valves $c$, $d$ and $e$ are open, and blowing is taking place, but at station E the valve $e$ is about to be closed. At the takeout station F, the valve $f$ is closed. The last ordinate designates the press station A, thus completing the cycle.

In Fig. 32 the turret has advanced clockwise about one-third of the way between stations, and the dogs 354, 355 have reversed their movement and are moving clockwise but at a slower speed than the turret, hence dog 354 will be opening valve $b$ and dog 355 will be closing valve $e$. Valves $a$ and $f$ are still closed, and valves $c$ and $d$ are still open.

In Fig. 33 the turret has advanced about two-thirds of the way between stations, and dogs 354, 355 are still moving in the same direction, but owing to the turret moving faster than the dogs, valve $b$ passes beyond dog 354, and is thus completely opened between stations B and C. Similarly, valve $e$ is completely closed between stations E and F by dog 355, the other valves remaining in the same condition as in Fig. 32.

In Fig. 34 the turret has completed a partial rotation and come to rest, having advanced each valve one station, and dogs 354, 355 have started to move in the opposite, or counter-clockwise direction, but the condition of the valves is the same as in Fig. 33.

With the dogs set as shown in Figs. 31-34, the blowing begins between stations B and C and continues to a point between stations E and F.

Figs. 35–37 illustrate how the blowing is begun and stopped while the turret is stationary.

In Fig. 35 valves *a*, *b* and *f* are closed and valves *c*, *d* and *e* are open, valve *b* being about to be opened and valve *e* being about to be closed by dogs 354, 355 moving counterclockwise.

In Fig. 36 valves *a*, *e* and *f* are closed, and valves *b*, *c* and *d* are open, valve *b* having just been opened, and valve *e* having just been closed by the continued counterclockwise movement of dogs 354, 355.

In Fig. 37 the valves are in the same condition as in Fig. 36, but the turret has started to rotate clockwise and has advanced about half way between stations, and dogs 354, 355 have started to move clockwise. However, owing to the more rapid movement of the turret, the dogs 354 and 355 are brought nearer valves *a* and *d* so that when the turret stops again the dogs will be ready to operate these valves by a slight counterclockwise movement.

Hence, with the dogs set as shown in Figs. 35–37, blowing begins while valve *b* is at station B and stops while valve *e* is at station E, while the turret is stationary.

Inasmuch as the dogs may be set at any desired position on cam 345, and may actuate the valves whether the turret is moving or stationary, it is possible to begin or stop blowing at any desired time, thus extending the capacity of the machine to cover a wide range of requirements for different kinds and sizes of ware.

*Take-out mechanism*

To remove the ware from the blowing mechanism automatically and deliver it to any suitable receiving or conveying mechanism, the present invention includes a take-out apparatus and a receiving table (Figs. 38–41).

The take-out proper and its operating mechanism comprise a take-out shaft 370 (Fig. 38) secured in suitable bearings in a bracket 371 mounted on column 61, means for swinging the take-out into proximity with the neck ring holding the ware, a delivery plate for receiving the ware from the neck ring, a plug for steadying the ware on the plate, and certain other purposes, means for swinging the take-out away from the neck ring to a suitable delivering position, and means for wiping the ware from the delivery plate onto any suitable receiving or conveying means.

The means for swinging the take-out into and out of proximity with the neck rings comprises a pair of cams 372 and 373 mounted on shaft 118 and adapted to engage rolls 374 and 375 secured on cam arms 376 and 377 respectively (Fig. 39), which are rigidly secured to shaft 370 (Fig. 38), cam 372 moving the take-out into proximity with the neck rings and cam 373 moving it outwardly to deliver the ware.

A delivery plate bracket 378 (Fig. 38), terminating in a delivery plate 379, is mounted on a suitable bushing 380 on shaft 370 to permit its turning independently thereof, and has two projecting lugs 381 and 382 for purposes to be described later.

This plate is swung in underneath the ware as described below, and to prevent the ware from sticking to the neck ring when the latter is opened, as well as to steady the ware as the plate is subsequently swung outwardly, there is provided a plug 383 which is reciprocated vertically by a lever 384 pivoted to the bracket 335 rigidly secured to the take-out shaft 370. This lever 384 is actuated by a cam 385 on shaft 118 which engages a roll 386 on one end of a lever 387 pivoted to a bracket 388, on the lower arm of bracket 371, the other end of lever 387 being forked and engaging a sliding collar 400 on shaft 370. A pin 401, which is secured to the lower end of a rod 402 housed in the take-out shaft, projects outwardly through a slot 403 in the latter for engagement with collar 400. To transmit this motion to lever 384, the latter has a portion 404 which bears against a nut 405 on the upper end of rod 402.

When cam 385 lifts the roll on lever 387, rod 402 is lowered, thus raising plug 383, and lowering a collar 406, loose on rod 402, which bears against and compresses a coiled spring 407 sleeved on the rod and acting against a stop 408 pinned to shaft 370. When cam 385 releases lever 387 the compression of the spring raises rod 402 and lowers the plug, but the cam is so timed that this does not occur until delivery plate 379 is below the ware. The neck ring is then opened, and the article is carried away by the take-out.

Mounted on a bushing 410 on shaft 370 is a bracket 411, terminating at one end in a yoke 412 which engages a guide 413 on the take-out bracket 371, to hold bracket 411 against angular movement, but permitting the vertical adjustment thereof. At its other end the latter terminates in a cam plate 414 for a purpose about to be described.

Keyed to the shaft 370 is a delivery rod bracket 415 (Fig. 38) which is preferably integral with bushings 380 and 410, so that these members may be adjusted together. To bracket 415 is pivoted an arm 416, which at its outer end carries a cam roll 417 for engaging cam plate 414 and at its inner end carries a delivery rod 418 (Figs. 38–41). Secured to the hub of bracket 415 is a lug 420 which engages lug 381 on the delivery plate bracket 378 and swings the latter inwardly when shaft 370 is actuated by cam 372. A spring 421 (Fig. 38) which surrounds the shaft, and the ends of which are secured to the brackets 415 and 378 respectively, causes bracket 378 to swing outwardly when it is released, by the outstroke of bracket 415, and yet forms a yielding connection which permits bracket 378 to stop while the continued movement of bracket 415 causes the delivery rod 418 to wipe the ware off delivery plate 379 as explained below (Fig. 41). On the inward stroke the spring holds bracket 378 stationary until picked up by lug 420 on bracket 415 striking lug 381 on bracket 378 (Fig. 40).

When the take-out shaft is swung inwardly (Fig. 39), roll 417 engages cam plate 414 and is swung outwardly, forcing rod 418 inwardly behind delivery plate 379 and distending a spring 422 which connects the roll with any convenient point on the machine (Figs. 38 and 39). When the take-out is swung outwardly again the tension of spring 422 holds roll 417 against the cam plate and gradually swings rod 418 substantially into alignment with the rear of the delivery plate, which is the position it assumes during the first part of the outstroke, as the delivery plate is brought into proximity with a receiving or conveying mechanism 423 (Fig. 40). At this time lug 382 on the delivery plate bracket will have contacted with the stop or guide 413, limiting its outstroke, but the take-out shaft still continues its motion causing the delivery rod bracket 415 to swing delivery rod 418 across delivery plate 379 and bracket 335 to move plug 383 outwardly, the combined action of the delivery rod and the plug wiping the ware off onto the receiving or conveying mechanism 423 (Fig. 41). When this has been completed, cam 385 raises plug 383, leaving the article free to move with or be removed from the receiving or conveying mechanism. Hence Fig. 39 shows the relation of the take-out parts when they are swung into position for receiving the ware from a neck ring, Fig. 40 shows the outstroke of the delivery plate completed, bringing the ware into proximity with the receiving or conveying mechanism, and Fig. 41 shows the ware deposited on the latter by the action of the delivery rod 418 and the plug 383.

The delivery rod bracket 415 also carries a stop pin 424 which engages arm 416 to prevent its being swung too far by spring 422 on the outstroke of the delivery rod bracket (Fig. 41).

Cam plate bracket 411, delivery rod bracket 415, and delivery plate bracket 378 can be set at any desired height on the take-out shaft (Fig. 38) for making various sizes and shapes of ware. Lug 382 on the delivery plate bracket is also adjustable to vary the outstroke limit of the delivery plate and thereby prevent its striking the receiving or conveying mechanism 423 (Figs. 40 and 41).

Although the take-out proper may deliver the ware to any desired receiving or conveying mechanism, in the preferred embodiment of the invention this comprises a receiving table 425 from which it may be removed in any appropriate manner, either by hand or automatically.

This table may be rotated on a shaft 426, to move each piece of ware out of the way of the next piece, by any convenient means, which is herein shown as a pawl and ratchet mechanism 427 (Fig. 39) actuated by cam 357 on shaft 118 through bell crank lever 358 and a link 428 (Figs. 2, 20 and 39). The receiving table can be adjusted to the desired height on shaft 426 by a clamp 429 (Fig. 39).

*Safety devices*

A very important feature of the present invention is the provision of a series of safety devices which will stop the machine if any of certain important parts of the machine should for any reason fail to function properly. Suitable trip or trigger devices are disposed at different locations on the machine, so as to be operated by failure or derangements of critical or important parts. They may be connected in various suitable ways to a switch or other means for stopping the machine, or stopping the motor by which the machine is driven. When arranged as herein shown, they serve, when operated, to throw out the clutch member 81 (Figs. 6 and 7), this motion being transmitted to the latter through a trip lever 440 (Figs. 4, 42 and 43) pivoted at 441 to any convenient part of the machine. Both ends of this lever are forked, its inner end straddling the piston rod 101 and bearing against a collar 442 secured thereto, whereas its outer end is secured by a pin 443 (Figs. 44, 49 and 51) to one end of a spring rod 444 whose other end is mounted in a bracket 445. Also mounted on pin 443 is one end of a link 446 (Figs. 43 and 51) the other end of which is attached to one end of a trip pawl 447 which is pivoted at its other end to bracket 445. A coiled spring 448 on rod 444 bears at one end against a fixed stop 450 on rod 444, at its other end bearing against bracket 445 through which the rod passes. This spring serves to push the inner end of trip lever 440 to the right (Fig. 43) and move the clutch out of engagement when the trip lever is released, by any of the trip or trigger devices referred to.

Mounted in brackets 451, 452 are two shafts, a trip shaft 453 and just above it a trip auxiliary shaft 454 (Fig. 44). These shafts receive the tripping motions of the safety devices and transmit them to the trip lever as described below. Pinned to shaft 453 is a collar 455, which has a shoulder 456 for engaging a corresponding shoulder 457 on a latch 458 that fits loosely on shaft 453, to operate the trip when shaft 453 is rocked (Fig. 48). The engagement of these shoulders also limits the motion of latch 458 in the opposite direction, it being pulled in that direction by a torsion spring 460 which passes around shaft 453 and the ends of which engage shaft 454 and a projecting hook 461 on latch 458 (Fig. 44). This spring holds hook 461 down in front of a corresponding finger 462 on pawl 447 when trip lever 440 is set, which is accomplished by pulling its outer end to the right and swinging link 446 into alignment with rod 444 (Figs. 42 and 44), thus pulling pawl finger 462 under latch hook 461. For convenience in setting the trip lever, it has a recess 463 (Figs. 42 and 44) into which a bar can be inserted to obtain increased leverage for overcoming the pressure of spring 448, after which latch hook 461 is moved down over finger 462, and the trip lever is held in this position until a trip is released. This occurs when latch 458 is rocked as described below, and, through the toggle joint mechanism just described, the compression of spring 448 forces the inner end of trip lever 440 to move to the right and the pawl 447 to swing outwardly (Fig. 43), moving piston rod 101 to the right and throwing out clutch member 81. The above described tripping does not affect the trip auxiliary shaft 454. Trip lever 440 will also be released when the trip auxiliary shaft 454 is rocked (Fig. 47) as described below. When this occurs it causes a collar 483 pinned to shaft 454 to engage a lug on latch 458 and lift latch hook 461, thus releasing trip lever 440 without rocking trip shaft 453.

It may sometimes happen that the machine will for some reason be subjected to an unusually heavy load which, if sustained for any appreciable length of time, would strain or break some part of the machine. To prevent this, the machine has the overload release 73 which may be of any well-known type, or as in Figs. 45 and 46, in which it comprises two sleeves 464 and 465, the former being secured to section 71 and the latter to section 72 of the drive shaft, these sleeves being normally caused to travel together by a pawl 466 housed in a recess in sleeve 464 and held in engagement with a recess 467 in sleeve 465 by a spring 468, of sufficient tension to carry the desired load, but yieldable when this is exceeded, permitting the pawl to be displaced from its seat in sleeve 465 and allowing the driving section 71 to continue its rotation without further actuating the driven section 72.

The synchronism between the feeding machine and the shaping machine will always be preserved when the latter is being driven because the releasable driving connection can only be reset at one point; namely, with the pawl 466 in engagement with the single recess 467 in sleeve 465.

The overload release is also provided with connections to throw out the clutch and thus stop the entire machine when the overload release operates. Otherwise there may be a repeated resetting and releasing of the pawl 466 on each revolution of the driving section 71 of the drive shaft, until the trouble is remedied.

In the present invention such stopping is effected by transmitting the tripping motion of the overload release 73 to the trip lever 440 through the main safety trip 470 (Figs. 45 and 46) which comprises a trip rod 471 housed in brackets 451 and 472, and on which is sleeved a spring 473 which at one end bears against a stop 474 on rod 471, and at its other end bears against bracket 472. To set the trip the rod is pulled downwardly by a handle 475 attached to stop 474, compressing spring 473. A latch 476 pivoted to bracket 472 is then pulled over the head 477 of rod 471, and normally held in that position by a spring 478. However, when the overload release operates, pawl 466 is forced outwardly so that its outer end traverses the outer instead of the inner dot and dash line path shown in Fig. 45 and engages a bell crank lever 480 pivoted on any convenient bracket (not shown). This pulls the other end of lever 480 to the left and, through a connecting rod 481 (Fig. 46), disengages latch 476 from the head 477 of trip rod 471, whereupon spring 473 forces the rod upwardly and lifts a dog 482 (Fig. 45) secured to the trip auxiliary shaft 454, thus rocking the latter and causing collar 483 to rock latch 458 (Fig. 47). This releases trip lever 440 and throws out clutch member 81.

As shown diagrammatically in Figs. 47 and 48, when tripping is caused by the rocking of shaft 454, collar 483 engages latch 458 and lifts it without rocking trip shaft 453, owing to latch 458 being loosely mounted on the latter. However, when tripping is caused by the rocking of shaft 453, as described later, collar 455 thereon engages latch 458 and trips the machine without affecting shaft 454.

Other specific safety trip devices shown in the drawings will now be described, it being understood that similar trips may be provided elsewhere if needed.

*Mold opening trip.*—This releases the clutch and stops the machine if a blow mold fails to open at the desired time, and thus prevents it from contacting with the take-out at the take-out station F, or with a blank mold at the pressing station A. The mold opening trip 486 is shown in its set position in Fig. 26 and in its released position in Fig. 27. As described previously, cam 253 engages a roll 254 on an arm 255 to actuate connecting rod 257 to open the molds. Arm 255 is normally secured to and moves with an arm 487, also pivoted on rock shaft 256, by a swinging link 488 pivoted to arm 487 and having a notch 500 that is normally held in engagement with a projection 501 on arm 255 by a spring 502, attached to link 488 and to a lug 503 on arm 487. A pin 509 on arm 487 prevents this arm from moving further inward than arm 255 (Fig. 26) and arm 255 from moving further outward than arm 487 (Fig. 27). Member 255 also has a projection 504 which engages a finger 505 on a collar 506, secured to a trip rod 507 which is mounted in a projecting lug 508 on arm 487 and slides loosely through a recess 510 in connecting rod 257. A coiled spring 511, sleeved on rod 507, bears at one end against lug 508 and at its other end against collar 506, tending to raise the rod. Any suitable means, such as a pin 512 in rod 507, prevents the spring from lifting rod 507 entirely out of lug 508. When the trip is set this rod 507 is depressed against the compression of spring 511 and finger 505 is engaged under projection 504 on member 255, members 255 and 487 then moving together. However, if a mold is prevented from opening when cam 253 moves roll 254 inwardly, projection 501 on member 255 is disengaged from the notch in link 488 against the pressure of spring 502, and member 255 moves inwardly although member 487 cannot do so (Fig. 27). This releases finger 505 on trip rod 507 and spring 511 forces the latter upwardly, whereupon it lifts a dog 513 rigidly secured to the trip auxiliary shaft 454, and releases latch hook 461 and trip lever 440 as described above, thus throwing out clutch member 81.

*Mold closing trip.*—Should a mold fail to close at the proper time, as by glass getting wedged in between the mold halves, the machine should be stopped, as it would not only form defective bottles but might break parts of the machine. To accomplish this, a mold closing trip 514 (Figs. 24 and 25) is provided. As the molds are revolved, their rolls 263 traverse the dot and dash lines shown in Fig. 24, each roll being subsequently brought into proximity to a swinging arm 515 pivoted at 516 to any convenient part of the machine, as a bracket 517. Arm 515 is pulled towards the blow turret axis by a spring 518, one end of which is secured to the arm and the other to a stud 520 projecting from bracket 517. If a mold is not completely closed, when its roll comes into proximity to arm 515, the roll will collide with the latter and swing it outwardly, releasing a spring pressed finger 521 which constitutes the upper member of a bell crank lever 522, pivoted in bracket 517. The other end of lever 522 is attached to one end of a trip rod 523, whose other end passes through a bracket 524 and thence through a dog 525 fixed on the trip auxiliary shaft 454, any convenient securing means 526 preventing disengagement of rod 523 and dog 525. A coiled spring 527, sleeved on trip rod 523, bears against bracket 524 and a collar 528 secured to the trip rod, and constitutes the means for throwing finger 521 inwardly when arm 515 is swung outwardly. This rocks the trip auxiliary shaft 454 and releases latch hook 461 and trip lever 440, throwing out clutch member 81.

*Plunger operated trip.*—If for any reason, such as failure of the air supply, the plunger should not rise at the desired time, the machine should be stopped, to prevent the serious breakage which would result if the turrets should turn. This is accomplished by a plunger operated trip 530 (Figs. 49, 50 and 51) comprising a dog 531 rigidly secured to trip shaft 453, and means for rocking said dog if the plunger fails to rise. Pressure is exerted on dog 531, tending to pull it inwardly, by a spring 532 (Figs. 1 and 4) which connects an arm 533 on trip shaft 453 with the bed of the machine. This spring pressure holds a roll 534, on a cam arm 535 secured to trip shaft 453, against a cam 536 on shaft 117, when its high part 537 is adjacent the roll (Fig. 50), and as long as the roll 534 is not pulled in any farther the trip is not released. When the rotation of shaft 117 brings the low part 538 of cam 536 adjacent roll 534 (Fig. 49), dog 531 is normally prevented from moving inwardly by a sliding collar 540 supported by a clamp 541 on a trip rod 542 the upper end of which is attached to the outer end of a lever 543 (Figs. 1 and 2) pivoted in a bracket 544 on upper tie 64, and whose lower end is guided by a bearing 545 (Figs. 50 and 51) carried by bracket 451 on column 61. At its inner end lever 543 is connected with piston rod 204 by a connecting rod 546 and a bracket 547 (Figs. 1, 2 and 56). As the plunger rises and descends, sleeve 540 is lowered and raised, hence when the low part 538 of cam 536 is adjacent roll 534, the plunger should be up and the sleeve 540 should be down (Fig. 49) to prevent dog 531 from moving inwardly. If the plunger fails to rise at the proper time, the sleeve 540 will not be lowered, at which time the low part of cam 536 allows the spring 532 to move the dog 531, thus turning the trip shaft 453. This rocking of trip shaft 453 will lift latch hook 461, which is carried thereby, and release trip lever 440, throwing out clutch member 81. Sleeve 540 is preferably slidable on trip rod 542 so it can be held up by dog 531 and prevent breakage should the rod descend after this trip has operated (Fig. 51). By adjusting clamp 541 (Figs. 50 and 51) sleeve 540 can be set at different points on trip rod 542 when making different sizes of ware.

*Blank mold lift safety.*—The means for taking up the thrust of the mold lift arm 126, if a slide encounters any obstruction as it is being lifted, has already been explained, but it remains to describe the blank mold lift safety, which trips the machine if the thrust exceeds a certain amount, thus preventing the breakage which would probably otherwise occur. This safety comprises a trip rod 548 (Fig. 16) that connects yoke 132 with a dog 550 rigidly secured to the trip auxiliary shaft 454. The latter can be moved a limited amount without tripping the machine, because collar 483 (Fig. 48) has a slight amount of lost motion before striking latch 458. This prevents the trip from being operated by the normal rocking of yoke 132 on shaft 131. However, if a slide 121 encounters any unusual resistance while being lifted by arm 126 as, for instance, if a blow mold should be in the way of the ascending slide, yoke 132 will be rocked, pulling dog 550 inwardly, and rocking shaft 454 sufficiently to cause collar 483 to strike latch 458 and lift latch hook 461, thus releasing lever 440 and throwing out clutch member 81.

*Resetting of the trips.*—When any of these trips have been released, it is necessary to reset trip lever 440 as above explained, and also, in the case of the main safety trip 470, the mold opening trip 486, and the mold closing trip 514, to reset these individual trip mechanisms before the machine can again be operated automatically.

For convenience in turning the blow turret to bring it to the desired point for starting the machine, there is provided a handwheel 551 on a stud shaft 552, secured in brackets 445 and 524 and carrying at its inner end a pinion 553 for engagement with a gear wheel 554 on cam shaft 117 (Fig. 4).

For stopping the machine manually, as when the compressed air is off, or for restoring the trip auxiliary shaft 454 to its normal position after it has been tripped, this shaft is provided with a handle 555 (Fig. 44).

*Auxiliary features.*—In addition to the features above described the preferred embodiment of this invention has certain auxiliary features, such as an adjustable conduit, a reciprocating deflector, a weight counterbalance, and a weight indicator for the mold charges, which features will be described in the order indicated.

Although this apparatus may be supplied with mold charges 556 formed and delivered to the blank molds 109 in any desired manner, they are herein shown (Fig. 52) as being supplied through a conduit 557 from which they are guided into the molds through an opening 558 in lower tie 65 by a deflector 560. The latter may be cooled or lubricated in any desired manner, as by an oil spray supplied through a pipe 559.

*Adjustable conduit.*—It is desirable to have conduit 557 adjustable for proper alignment with deflector 560 so mold charges 556 will slide down the conduit at the desired speed, and in the present invention means are provided for adjusting the conduit up, down and sidewise. The lower end of the conduit is supported by a bracket 561 (Fig. 52) on lower tie 65, through an adjusting means 562 comprising a yoke member 563 which has a pair of studs 564. These studs provide a rocking pivot for the lower end of the conduit, which is retained thereon by any suitable means, for instance, the latches 565 (Fig. 53) mounted in suitable recesses 566 in yoke member 563, and having springs 567 for holding them in their innermost position and preventing removal of the conduit except when they are withdrawn into the recesses 566 by operating the handles 568. By pulling these handles outwardly, and then turning them through a slight angle, the latches may be held in the withdrawn position.

To provide for raising and lowering the lower end of the conduit, the yoke member is pivoted at 570 in a bracket 571 secured to the upper end of threaded rod 572, which has an operating hand wheel 573 and a lock nut 574 for retaining the conduit in its adjusted position. An auxiliary means for adjusting the height of the conduit is also provided by forming yoke member 563 with a series of parallel fingers 575 (Figs. 52 and 53), between which is secured a double headed collar nut 577 on an operating rod 578 which is housed in bracket 571, and provided with an operating handle 580 the shank of which is connected with the operating rod by a universal joint 581. When the handle is turned, the lower portion of the yoke member 563 is moved forward or drawn backward, respectively raising or lowering the end of the conduit.

To permit of adjusting the lower end of conduit 557 sidewise, yoke 563 has a pair of parallel fingers 582 (Figs. 53 and 54) which engage an eccentric 583 on an operating rod 584, also secured in bracket 571 and having an operating handle 585 mounted similarly to handle 580. When handle 585 is turned, yoke 563 is shifted laterally on its pivot 570, thus moving the end of the conduit to the right or left. The shanks of operating handles 580 and 585 are made any desired length and preferably extended to any desired operating point, so that the operator of the machine can adjust them without leaving his post.

To compensate for the adjustment by handle 580, which swings the yoke in and out to raise and lower the conduit, the fingers 582 on the yoke are made of sufficient width to engage the roll 583 even though handle 580 is given its maximum adjustment in either direction. Likewise, to compensate for the adjustment by handle 585, wich swings the end of the conduit from side to side, the double headed collar nut 577 and the fingers 575 on yoke 563 are suitably proportioned (Fig. 53) to insure their engagement when the eccentric roll 583 is given its maximum throw in either direction.

*Reciprocating deflector.*—As indicated above, the charge 556 is preferably guided into the blank mold 109 by a deflector 560. The latter consists essentially of a curved member pivoted at 586 to a suitable bracket 587 on lower tie 65 and mounted with the concave portion of its curve facing the conduit 557. The lower portion 588 of the deflector may be closed (Fig. 52), whereas the upper portion may be open, the choice of a wholly closed, wholly open, or partly closed and partly open deflector depending upon operating conditions, one deflector being readily replaced by another of a different size or shape.

To insure proper alignment with the conduit, and also with the blank molds when they are in receiving position, the deflector 560 is adjustable and is herein shown as having means for adjusting it toward and from the conduit and for changing its angularity, the former being accomplished by adjusting a collar screw 589 to move bracket 587 toward or from the conduit, after which lock bolts 600 (Figs. 2 and 20) may be tightened to hold the bracket in position.

To change the angularity of the deflector, either to align its lower end with a blank mold or to cause the mold charges to leave the deflector in a direction parallel with the axis of the molds, there is provided an operating handle 601 (Figs. 2, 20 and 52) secured in lower tie 65, and having a threaded lower end 602 (Fig. 52) which engages one end of a bell crank lever 603 pivoted at 604 to the lower tie. At its other end this lever is connected with one end of the deflector by a pin 605, hence when handle 601 is turned it rocks lever 603, causing it to swing the deflector on pivot 586.

Although in some instances it may be satisfactory to have a deflector which is stationary during the operation of the machine, it is often desirable to have the deflector reciprocable into and out of the mouth of the mold. For this purpose the deflector pivot 586 (Fig. 52) is secured in a slot 606 in bracket 587, and the pin 605, which connects the deflector with the adjusting means, is secured in a slot 607 in the deflector.

The reciprocating means may be arranged in any convenient manner. As herein shown (Fig. 52) it consists of a lever 608 pivoted at 609 to any appropriate part of the machine and operated by a suitable cam 610 which engages a roll 611 on one end of lever 608. At its other end this lever is attached to one end of a link 612, connected to the deflector by pivot 586. When cam 610 depresses roll 611 the deflector is lifted, and when the roll is released the deflector is lowered by its own weight, permitting its lower portion 588 to engage a blank mold 109. Although this engagement may be of any character desired, the lower portion of the deflector is preferably positioned within the mold to insure the charge passing wholly into the mold cavity and prevent its spilling over the edge of the mold. Cam 610 may be mounted on any suitable part of the machine, but will preferably be mounted on shaft 118, so that the deflector 560 will be lowered and raised in synchronism with the movements of the blank turret.

Instead of lifting the deflector positively, it might be lowered positively and raised by spring action. It is considered preferable, however, to provide positive lifting means to prevent the breakage which might ensue if a spring lifting means failed to function properly.

*Plunger counterbalance.*—It has been customary to provide a yielding connection, such as a spring, between the plunger and its actuating mechanism, so that the plunger is capable of yielding to accommodate slight variations in the amount of the mold charge. The plunger and the parts moving therewith are, in many cases, of considerable weight. It sometimes happens, particularly in making small ware, that the weight of the plunger and its associated parts is considerably greater than the pressure which should be exerted on the mold charge to produce good ware. Under these conditions it frequently occurs that the spring, or other yielding connection interposed between the plunger and its actuating mechanism, is comparatively weak in order to produce the desired relatively low pressing pressure. The plunger, to be started into movement by this yielding connection or spring, was so heavy that its inertia at the moment of starting and before engagement with the glass, caused the spring to be compressed, permitting the actuating member to catch up to some extent with the plunger. Immediately thereafter, the spring would act to return the plunger to its normal position relative to its actuating means, thereby temporarily increasing the speed of the plunger over its actuating means. When the plunger thus accelerated, is brought up against the stop, which must be provided to limit the expansion of the spring, it might rebound, thereby producing a sort of hammering actuation of the plunger during its descent, instead of a steady continuous movement of the controlling member. This reciprocation of the plunger relative to the operating means during the downward travel thereof results in that the springs may, in one case, be urging the plunger downwardly at a faster rate than its operating means at the time that the plunger engages the glass, in which case the pressure is much greater than that necessary. In another case the plunger may be reversing its direction of movement relative to the operating means when it engages the glass, in which case there is a lighter pressure exerted on the glass than that necessary.

In order therefore to eliminate the above described complications, means are provided for eliminating both the weight and varying speeds of the factor in producing the pressure, leaving that pressure to be controlled only by a single factor, preferably by springs which are adjustable to suit the pressure desired. For conciseness of description the plunger 206 and those parts which move with it as a unit, such as the plunger rod 205 and collar 613, are referred to as the plunger structure. The pressure of the plunger in the glass, due to the weight of the plunger structure and to the momentum of its descent, would sometimes be greater than is required for the pressing operations, especially on small ware. To this end the weight of the plunger structure is counterbalanced by a connection between the plunger rod 205 and the piston rod 204, and this counterbalancing device is preferably applied equally on opposite sides of those rods. In the embodiment herein shown (Figs. 55 and 56) a suitable collar 613 is secured on the upper end of the plunger rod by a nut 614, and the counterbalancing device is connected between the opposite sides of this collar and suitable yokes 616 mounted on the opposite sides of a plate 617 on the upper end of piston rod 204. A pair of counterweight arms 615 are pivoted at their inner ends to the collar 613 and are pivotally connected to the yokes 616. At the outer ends of the arms 615 are attached counterweights 623 which may be adjustable on the arms to facilitate accurate setting. The lower ends of a pair of springs 622 are connected by suitable shackles to the arms 615. The upper ends of these springs are connected by similar shackles to a cross bar 621 supported by a plate 618, which in turn is supported on rods 620 extending upwardly from the plate 617. These rods are threaded and provided with adjusting nuts 619 by which the tension of the springs 622 may be adjusted. To provide a wide range of adjustment for the pressing effect of the springs 622, the arms 615 and bar 621 are provided with a series of holes or notches at different distances from the center of the plunger rod 205 to receive the spring shackles. Thus the weight of the plunger structure is counterbalanced at all positions and speeds by the weight of the counterweights 623, so that the pressure applied to the glass is determined solely by the tension and lateral position of the springs 622.

It will be observed that the counterbalancing mechanism is arranged between the plunger structure and the operating means and moves bodily with the plunger throughout its travel, so that in all positions in the downward stroke of the plunger, the inertia of the plunger is balanced by that of the counterweights 623, thus eliminating any tendency for the movement of the plunger to lag behind that of the operating means.

*Weight indicator for the mold charges.*—When the operator has once adjusted his feeding means to produce the proper size of mold charges 556, it is highly desirable that this be maintained in spite of the changing conditions of the glass in the furnace, hence any means which will quickly show the operator that his weight is changing is highly useful. In the present invention this is indicated by a pointer 625, pivoted at an intermediate point 626 in a suitable bracket 627 carried by plate 617, and having one end secured to collar 613 on the plunger rod by suitable pivot bolts 628 (Figs. 55, 56 and 57), which may either be attached directly to collar 613 or to an intermediate collar 630 attached to collar 613 (Figs. 56 and 57). The opposite end of pointer 625 registers the relative weight of the charges on an indicator plate 631 (Figs. 55 and 57) carried by plate 617. This indicator plate may be of any desired type or material, such, for instance, as a blackboard on which suitable position indications are marked from time to time, or may have upon it a graduated scale.

The theory of operation of this indicator is that the plunger will descend further into a light charge than it will into a heavier charge, hence, when the position of the end of pointer 625 relative to the indicator plate has been marked or noted for the proper charge, a higher position will indicate a lighter charge, and a lower position a heavier charge. The operator can then adjust his feeder to produce charges of the proper weight, and can note the progressive effects of the adjustment as the pointer approaches the proper position for the weight of ware being made.

*Operations for forming one article.*—A typical series of operations for forming one article, in the particular embodiment of the invention shown herein, is as follows:

1. The operating handle 105 of the valve 104 (Fig. 4) is turned to starting position causing piston 102 to operate rack 100 and throw clutch member 81 into engagement with member 80, thus revolving drum shaft 78 and imparting an intermittent rotation to the turrets 67, 66 by the engagement of rolls 112 with the drum 110.

2. One set of blowing mechanisms, including a blow head 313, neck ring 157, blow mold 243 and bottom plate 276, having just passed the take-out station F, a neck ring spring 171 will close this neck ring and latch 172 (Fig. 20), and the rotation of blow turret 67 will bring this neck ring into the neck ring holder support 214 on lower tie 65 which is its proper position at the press station A.

3. While this is taking place, a charge of glass 556 will have been fed to one of the blank molds 109 through deflector 560 (Fig. 52) and this blank mold will have been revolved and elevated by the rotation of blank turret 66 (Fig. 11) until it is in line with plunger 206 and neck ring 157 at station A.

4. The mold lift cam 111 will then actuate the mold lift arm 126 and elevate this blank mold to a proper height for pressing (Figs. 4, 15, 16 and 17).

5. At this time, the plunger will be lowered owing to the cam 220 on cam shaft 118 having released plunger valve 201, permitting the spring 223 in slide valve casing 224 to lower valve 201 and admit air to the upper end of plunger cylinder 200 causing the plunger to descend and pressing to take place (Fig. 1). The plunger is then raised, owing to cam 220 raising valve 201 so as to admit air to the lower end of cylinder 200, and the blank mold is lowered out of the way by mold lift arm 126.

6. Blow turret 67 will then rotate this set of blowing mechanisms to the mold closing station B, at which time blow head 313 and bottom plate 276 will be swung into position by sector gears 330, 328, and 280 (Fig. 20), by the time the turret stops, and then bottom plate 276 will be raised by cam 282 on cam shaft 117 actuating lever 281 (Figs. 29 and 30). The blow mold 243 will then be closed around the bottom of the neck ring 157 and bottom plate 276 (Fig. 10) by cam 270 on cam shaft 117 (Figs. 24 and 25) and blowing will be started either here or at any desired later time by dog 354 on cam 345 engaging a blow valve pin 348 and raising it, thus opening a valve 344 (Figs. 2, 3 and 10).

7. The mold 243 will then be revolved by the intermittent rotations of the blow turret, and blowing will be continued for any desired period, herein shown as ending at the fifth station E. Here the oscillation of cam 345 causes dog 355 to close valve 344 and stop the blowing (Figs. 2 and 3).

8. When the take-out station F is reached turret 67 stops, and blow mold 243 is then unlatched by being struck by the mold opening lever 251 carried by the upper arm of take-out bracket 371, and actuated by cam 250 on cam shaft 118 (Figs. 18 and 19). The blow mold is then opened by cam 253 on cam shaft 117 (Fig. 24), and bottom plate 276 is caused to descend by its own weight, controlled by the bottom plate dropping cam 304 on cam shaft 117 (Figs. 29 and 30). Immediately thereafter the take-out is swung in by cam 372 on cam shaft 118 and a roll 334 carried by bracket 335 strikes the blowhead 313 swinging it and bottom plate 276 out of the way of the take-out mechanism (Figs. 38 and 39).

9. At the same time that the blowhead is swung out of the way, the delivery rod or wiper 418 is swung inwardly behind the article, causing the take-out delivery plate 379 to follow along after it (Fig. 39) until it is under the article.

10. The plug 383, carried by lever 384, is then lowered into the article to steady it, due to cam 385 on shaft 118 releasing its pressure on lever 387 (Fig. 38).

11. Immediately thereafter the neck ring is unlatched by being struck by lever 177 (Figs. 18 and 19), and is opened by cam 165, which is actuated by cam 183 on shaft 118 (Fig. 20).

12. Take-out shaft 370 is then rotated by cam 373 on shaft 118 (Figs. 38 and 39), causing it to swing outwardly and carry the finished article into proximity with receiving table 425 (Fig. 40).

13. Delivery rod 418 in conjunction with plug 383 then moves the article from delivery plate 379 onto receiving table 425 (Fig. 41) and immediately thereafter plug 383 is raised by cam 385 on shaft 118 (Fig. 38). The spring 171 closes the neck ring as soon as cam 165 is disengaged and releases its pressure (Fig. 20). The turrets start to move just before the delivery plate reaches the receiving table (Fig. 40), hence blow mold 243 and neck ring 157 are being revolved to the press station A while the take-out is finishing its delivering operation (Fig. 3).

14. The empty blow mold 243 is then ready to start on a repetition of the above cycle (Fig. 3), which is the same for each article formed.

Although this invention has been described with reference to a machine which both presses and blows, many of its features can readily be used on machines which only press, and other features can be used on machines which only blow. Furthermore, while there is novelty not only in the combinations shown herein, but also in the specific features themselves, many equivalents of the specific features could be substituted therefor without going beyond the scope of the invention as indicated in the claims.

I claim:

1. In a glass shaping machine, the combination of a base, a plurality of columns supported thereby, an upper tie connecting said columns, a lower tie connecting two of said columns, a turret rotatably mounted on one column, a second turret having bearings in the base and the lower tie, means for actuating said turrets, and cam controlled means for rotating the turrets.

2. In a glass shaping machine, the combination of a mold, a member for supporting the mold, an air inlet in communication with said supporting member, and means for conducting air from the inlet around and downwardly past the outer side of the mold to cool it.

3. In a glass shaping machine, the combination of a rotary mold table, a series of slides carried thereby, locking means carried by each slide, a framework, a stop thereon, and means for successively positioning said locking means behind said stop to lock the table between each rotary movement.

4. In a glass shaping machine, the combination with a turret, of a series of slides carried thereby, a mold carried by each slide, a cam for giving the successive molds an initial elevating movement, and a cam controlled lever, for raising said molds still higher to their proper operating height.

5. In a glass shaping machine, the combination of molds, means for elevating said molds into pressing position, pressing means, and means, including an anvil, cooperating with the elevating means to form a toggle support to take the thrust of the pressing action.

6. In a pressing mechanism for a glass shaping machine, the combination with a plunger structure, of a weight counterbalance for the weight of the plunger structure, including spring actuated means for controlling the effective pressure of the plunger.

7. In pressing mechanism for a glass shaping machine, the combination with a plunger structure, of a weight counterbalance for the weight of the plunger structure, including a spring actuated device yieldable when the plunger strikes the glass, and adapted to thereafter impart the effective pressure of the plunger.

8. In pressing mechanism for a glass shaping machine, the combination with a plunger structure and its operating means, of means connecting these members and acting as a counterbalance for the weight and momentum of the plunger structure, including a weighted lever, and a spring arranged in opposition to the weight on said lever.

9. In pressing mechanism for a glass shaping machine, the combination with a plunger structure and its operating means, of means connecting these members and acting as a counterbalance for the weight and momentum of the plunger structure, including a weighted lever, a spring arranged in opposition to the weight on said lever, and means for increasing or decreasing the opposing effect of the spring.

10. In pressing mechanism for a glass shaping machine, the combination with a plunger structure, of operating means therefor, a pivoted lever connecting the operating means with the plunger structure, a weight carried by the opposite end of the lever for counterbalancing the weight of the plunger structure, and an adjustable spring device for imparting the effective pressure of the plunger.

11. In pressing mechanism for a glass shaping machine, the combination with a plunger structure, of a sleeve member in which the plunger works, a lever connecting these parts and pivoted to one of them, a weight attached to said lever for counterbalancing the weight of the plunger structure, spring actuated means for imparting the effective pressure of the plunger, and means for actuating the sleeve member.

12. In a glass shaping machine, the combination of pressing mechanism, means for permitting the pressing mechanism to yield when it strikes the glass, and an indicator pointer attached to said yielding means and indicating by its position the changes in the volume of the charges being pressed.

13. In a glass shaping machine, the combination of molds, a bottom plate for each mold, means for lifting the bottom plates to the proper height for engagement with the molds, and independent means for insuring a gradual lowering of the bottom plates after the shaping operation.

14. In a glass shaping machine, the combination of a rotary mold table, a series of hinged molds carried thereby, a bottom plate for each mold, means for successively swinging the bottom plates into alignment with said molds, other means for lifting the bottom plates to their operative position with respect to the molds, means for closing the molds therearound, means for blowing the articles to the desired shape, other means for opening the molds, other means for subsequently causing the bottom plates to be lowered, and additional means to swing the bottom plates out of alignment with the molds.

15. In a glass shaping machine, a blowhead which is normally open to the atmosphere, including a piston and a plate depending therefrom, and means whereby the depending plate is seated by the blowing air before any appreciable amount of air escapes through the piston.

16. In a glass shaping machine, the combination of blowheads, a gear on each blowhead, a bell crank lever carrying a gear for engagement with each blowhead gear, and a cam for actuating said levers to swing the blowheads into blowing position.

17. In a glass shaping machine, the combination of blowheads, a gear on each blowhead, a bell crank lever carrying a gear for engagement with each blowhead gear, a cam for actuating said levers to swing the blowheads into blowing position and independent means for swinging said blowheads out of blowing position.

18. In a glass shaping machine, the combination with a series of blowing mechanisms, each of which comprises a mold, blowhead and bottom plate, the blowheads and bottom plates being provided with gears, of a series of cooperating gears, and means for oscillating said cooperating gears to thereby swing both the blowheads and bottom plates into and out of alignment with the molds.

19. In a glass shaping machine, the combination of blowheads, levers, sector gears on the blowheads and the levers, a cam for actuating said levers to swing the blowheads into blowing position, a takeout, and means associated with the takeout for swinging the blowheads out of blowing position.

20. In a glass shaping machine, the combination of a turret, a series of molds carried thereby, a series of blowheads for conveying air to the molds, an oscillatory cam for controlling the admission of air to the blowheads, and adjustable means whereby blowing may be started or stopped at any desired time, irrespective of whether the turret is moving or stationary.

21. In a glass shaping machine, the combination of an intermittently moving turret, a series of molds carried thereby, a series of blowheads for conveying air to the molds, an oscillatory cam for controlling the admission of air to the blowheads, and adjustable means whereby blowing may be started or stopped at any desired time during the travel or the intermission of travel of the blowheads.

22. In a glass shaping machine, the combination of a rotatable turret, a series of molds carried thereby through a cycle of article forming operations, a series of blowheads for conveying air to the molds, an oscillatory cam for controlling the admission of air to the blowheads, and means associated with the cam for varying the period of blowing so it will occur during any desired portion of the cycle.

23. In a glass shaping machine, the combination of a column, a cam carried thereby, a mold table mounted for movement around the column, a series of molds and blowheads carried by the table, means for intermittently rotating the mold table, and means for oscillating the cam in a differential relation to the rotation of the mold table to control the admission of air to the blowheads.

24. In a glass shaping machine, the combination of a turret, a series of molds carried thereby, a series of blowheads for conveying air to the molds, a series of valves for supplying air to the blowheads, a cam for opening and closing said valves, and means for oscillating said cam.

25. In a glass blowing mechanism, the combination of blowheads, valves for admitting air to same, a cam for controlling the admission of air through said valves, and cam controlled means for actuating said cam.

26. In a takeout device for a glass shaping machine, the combination of a delivery plate, means for causing the plate to convey the ware from a receiving to a delivering station, and means moving with said plate to the delivery station and then having a further and differential movement with respect thereto to wipe the ware off the delivery plate at the delivering station.

27. In a takeout device for a glass shaping machine, the combination of a takeout shaft, a delivery plate and a wiper carried by the shaft, means to rotate said shaft through a part revolution for actuating the delivery plate to convey the ware from receiving to delivering position, and means for actuating the wiper to move with respect to said plate to remove the ware therefrom.

28. In a takeout device for a glass shaping machine, the combination of a delivery plate, means for swinging the delivery plate into proximity with the finished ware, means for depositing the ware on the delivery plate, means for swinging the plate to delivering position, and horizontally swinging means for wiping the ware off the delivery plate.

29. In a takeout device for a glass shaping machine, the combination of a delivery plate, a wiper, a cam for directing the wiper behind an article, means for swinging the delivery plate outwardly to deliver the article, and resilient means for then causing the wiper to remove the article from the delivery plate.

30. In a takeout device for a glass shaping machine, the combination of a takeout shaft, a delivery plate and a wiper carried thereby, means for swinging the delivery plate and wiper inwardly, a cam for directing the wiper behind the article, a spring to swing the delivery plate outwardly to deliver the ware when the plate is released by the means for swinging it inwardly, and means for swinging the wiper outwardly to remove the ware from the delivery plate.

31. In a takeout device for a glass shaping machine, the combination of a delivery plate for supporting an article, a reciprocating plug for steadying the article, a receiving table for receiving the article from the delivery plate, means for swinging the delivery plate from receiving to delivering position, and means for wiping the article off the delivery plate onto the receiving table.

32. In a glass shaping machine, the combination with a starting valve, of a piston controlled thereby, a rack actuated by the piston, a clutch, and operating connections between the rack and the clutch.

33. A glass forming machine, comprising a plurality of mechanisms for forming a glass article, operating means for said machine, a safety device associated with one of said mechanisms including a trip shaft, connections between said shaft and said operating means, and means for transmitting motion to said shaft to stop the operation of said machine in case said one mechanism should operate abnormally.

34. A glass forming machine, comprising a plurality of mechanisms for forming glass articles, means for transmitting power to operate certain of the said glass forming mechanisms of said machine, a clutch interposed in the power transmitting means, a safety trip device comprising a trip shaft, lever connections between said trip shaft and said clutch, and safety means for actuating said shaft to throw out said clutch when one of said forming mechanisms fails to function properly.

35. In a glass shaping machine, the combination of a clutch for transmitting power thereto and a safety trip device, the latter comprising a trip shaft, a trip latch carried thereby, a spring controlled trip pawl engaged by said trip latch, lever connections between said pawl and said clutch, and means for releasing said latch and throwing out the clutch in case the machine fails to function properly.

36. In a safety device for a glass shaping machine, the combination of a trip shaft, a series of tripping mechanisms attached thereto, a latch mounted on the trip shaft to normally maintain an operating connection between the parts of the machine, and means for transmitting rocking motion to said shaft to move said latch and release said operating connection in case of abnormal operation of the machine.

37. In a safety device for a glass shaping machine, the combination of a plurality of trip shafts, tripping mechanisms associated with each shaft, and means whereby the operation of any tripping mechanism will stop the operation of the machine.

38. In a safety device for a glass shaping machine, the combination of a plurality of trip shafts, tripping means associated therewith for rocking one of the shafts in case of abnormal operation of the machine, and means whereby the rocking of any trip shaft will trip the machine.

39. In a safety device for a glass shaping machine, the combination of a plurality of trip shafts, tripping means associated therewith for rocking one of the shafts in case of abnormal operation of the machine, and means whereby the rocking of any trip shaft will trip the machine without rocking the other shaft.

40. In a safety device for a glass shaping machine, the combination of a plurality of trip shafts, a collar fixed on each shaft, and a latch loosely mounted on one of said shafts and capable of engagement with either collar.

41. In a safety device for a glass shaping machine, the combination of a plurality of trip shafts, a collar fixed on each shaft, a latch loosely mounted on one of said shafts and capable of engagement with either collar, and means for normally holding said latch in engagement with one of said collars.

42. In a glass shaping machine, the combination of a clutch for transmitting power thereto, a latch for controlling the throwing out of the clutch, a series of molds, means for closing said molds, a trip device cooperating therewith, and means for transmitting motion from said trip device to said latch to trip the latter in case a mold fails to close.

43. In a glass shaping machine including a pressing plunger, the combination of a clutch for transmitting power to the machine, a spring controlled latch adapted when rocked to throw out said clutch, a trip shaft, a dog mounted on the trip shaft, means for normally preventing said dog from tripping the machine, and means operating through said dog to trip the machine in case the plunger fails to rise.

44. In a glass shaping machine, the combination of a series of molds, means for normally lifting said molds, a clutch for transmitting power to the machine, a spring controlled latch adapted when released to throw out said clutch, a trip shaft, a dog carried by said trip shaft, and means for actuating said dog and releasing said latch in case the molds are prevented from rising.

45. In pressing mechanism for a glass shaping machine, the combination with a plunger structure and its operating means, of means carried by and connected between the plunger structure and its operating means for counterbalancing the weight and momentum of the plunger structure.

46. In a glass shaping machine, the combination of a blank mold, a blow mold cooperating therewith, means for feeding glass to said blank mold, means for opening said blow mold, means for effecting relative movement between said molds to position said blank mold between the open sections of said blow mold, a plunger for pressing the glass in said blank mold while in said position to form a parison, and means for counterbalancing the weight of said plunger.

47. In a glass shaping machine, the combination of a mold having a passageway for cooling air therein, a vertically-slidable member for supporting said mold and having an air passageway therein communicating with the passageway in said mold, and means for regulating the amount of air passing through said passageway.

48. In a glass shaping machine, the combination of a turret, a series of slides carried by said turret, a blank mold mounted on each of said slides, air passages extending through said slides and through said molds, and means for controlling the admission of air through said passages.

49. In a glass shaping machine, the combination of an intermittently rotating blank mold, a neck ring with which said mold cooperates at times, means for lifting said blank mold toward operative position with said neck ring during the rotation of the blank mold, and supplementary means for positioning said mold in final operative relation to said neck ring while said mold is stationary.

50. In a glass shaping machine, the combination of two mold tables intermittently rotatable about different axes, blank molds mounted on one table, blow molds and neck rings mounted on the other table, means for elevating the blank molds during the rotation of their table, and means for elevating said molds into operative position relative to said neck rings while said molds are stationary.

51. In a glass shaping machine, the combination of a plurality of molds mounted for intermittent rotation about a vertical axis, glass shaping means disposed in the path of said molds, means for lifting said molds during the rotation thereof, and means for imparting a further lifting movement to said molds to bring them to their proper operating height for cooperating with said shaping means during the period of dwell in the rotation thereof.

52. In a glass shaping machine, the combination with molds mounted for rotation about a vertical axis, of means for intermittently rotating said molds, means for elevating said molds during their rotation, and other means for elevating said molds an additional amount to bring them to their proper operating height during the period of dwell in their rotation.

53. In a glass shaping machine, the combination with an intermittently rotatable turret, of a series of molds carried thereby, glass shaping means disposed in the path of said molds, a stationary cam for elevating said molds toward said shaping means during the rotation of said turret, and a movable cam for imparting to the molds a supplemental elevating movement to bring them to their proper operating height relative to said shaping means during the period of dwell in the rotation of said turret.

54. In a glass shaping machine, the combination of intermittently rotating molds, means for elevating said molds during the rotation thereof, and a cam-controlled lever for imparting a supplemental elevating movement to the molds to position them for the succeeding operation during the period of dwell in the rotation of said molds.

55. In a glass shaping machine, the combination with an intermittently rotating turret, of a series of slides carried thereby a mold carried by each slide, a cam for successively giving said molds an initial elevating movement during the rotation thereof, and auxiliary means for raising said molds an additional amount to position them at their proper operating height while said mold is stationary.

56. In a glass shaping machine, the combination of a pressing plunger and a counterbalance for the weight of said plunger, movable bodily with said plunger.

57. In a glass shaping machine, the combination of a pressing plunger, a pivotally mounted counterbalance therefor, and means for actuating said plunger, arranged to apply power through the pivotal support of said counterbalance.

58. In a glass shaping machine, the combination of a pressing plunger, actuating means therefor, and a weighted lever pivotally mounted on said actuating means and connected to said plunger for counterbalancing the weight of said plunger.

59. In a glass shaping machine, the combination of a pressing plunger, a movable support therefor, means for actuating said support, and means carried by said support and connected to said plunger for counterbalancing the weight of said plunger.

60. In a glass shaping machine, the combination of a pressing plunger, a movable support therefor, a weighted lever pivotally mounted on said support, and connected to said plunger for counterbalancing the weight of said plunger.

61. In a glass shaping machine, the combination of a pressing plunger, a movable member for actuating said plunger, and a weighted lever pivotally mounted on said movable member for counterbalancing the weight of said plunger.

62. In a glass shaping machine, the combination of a pressing plunger, fluid pressure means for actuating said plunger and including a piston rod, and a weighted lever pivotally mounted on said piston rod and connected to said plunger for counterbalancing the weight of said plunger.

63. In a glass shaping machine, the combination of a pressing plunger, plunger actuating means movable with said plunger, means carried by said actuating means for counterbalancing the weight of said plunger, and yieldable means connecting said actuating means and said plunger for controlling the effective pressure of said plunger.

64. In a glass shaping machine, the combination of a pressing plunger, fluid pressure means for actuating said plunger and including a piston rod through which said plunger extends, and a weighted lever pivotally mounted on said piston rod for supporting said plunger.

65. In a glass shaping machine, the combination of a plunger, actuating means for said plunger and movable relative thereto, and means carried by said actuating means for counterbalancing the weight of said plunger.

66. In a glass shaping machine, the combination of a pressing plunger, actuating means for said plunger and movable relative thereto, means carried by said actuating means for counterbalancing the weight of said plunger, and means for yieldably connecting said actuating means and said counterbalancing means for controlling the effective pressure of said plunger.

67. In a glass shaping machine, the combination of a pressing plunger, a mold associated therewith, a stripper plate mounted for yieldable vertical movement on said plunger, a plunger ring mounted for lateral floating movement on said stripper plate, to allow said plunger to center itself in said mold to correct small discrepancies of alignment, and means for preventing the centering action of said plunger from tilting the plunger ring and the stripper plate out of square with the plunger.

68. In a safety device for a glass shaping machine, the combination of a trip shaft, a plurality of tripping mechanisms associated with said shaft and operable respectively in response to abnormal operations of a plurality of parts of said machine, and means whereby the operation of any of said tripping mechanisms will rock said shaft to stop the operation of said machine.

69. In a safety device for a glass shaping machine, a continuously rotating driving shaft, a second shaft, a clutch mechanism between said shafts adapted to be normally held in driving engagement by a predetermined resilient pressure, but adapted to yield so that said second shaft is not positively driven upon the occurence of an overload sufficient to overcome said predetermined resilient pressure, a third shaft from which the power to drive said machine is derived, a mechanically operated clutch interposed between said second and third shafts, and means to effect the disengagement of said mechanically operated clutch upon differential motion of the first and second shafts.

70. In a glass shaping machine, the combination of a clutch for transmitting power to operate said machine, said machine including a mold, means for opening said mold, a trip device cooperating therewith, and means operable by said trip device for disengaging said clutch to stop the operation of the machine in case the mold fails to open.

71. In a glass shaping machine, a rotatable turret, a series of molds disposing about said turret, a clutch for transmitting power to said machine, means deriving power through said clutch for successively opening said molds at a take-out station, a trip device cooperating with said clutch, means operable in case any mold fails to open at said take-out station for actuating said trip device to disengage the clutch and stop the machine.

72. In a glass shaping machine, an intermittently rotated turret, a series of molds carried thereby, means adapted to open each of said molds successively at a take-out station, a continuously rotating driving shaft for said machine, a driven shaft from which the mold opening means derives power, a clutch interposed between said driving and said driven shafts, a cam arranged to be rotated by said driven shaft, a rocking lever actuated by said cam, a second rocking lever pivoted coaxially with the first lever, connections between said second lever and the mold whereby movement of said second lever is adapted to open said mold, means normally interconnecting first and said second levers, whereby the mold is normally opened by said cam, means for disengaging said levers in the event that the mold fails to open to avoid breakage of the parts, and means for throwing said clutch out of engagement upon differential movement of said levers.

73. In a glass shaping machine, the combination of a rotatable turret, a series of blow molds thereon, means to open and close said molds, a blank mold, means to raise said blank mold to a position in axial alignment with said blow mold when closed and between the open halves thereof, means to form a parison in said blank mold when in said raised position, means to thereafter lower said blank mold, a series of neck rings mounted on said turret and cooperating both with said blow molds and said blank mold, the blank mold when lowered leaving the parison suspended from said neck ring, means to thereafter close a blow mold about the parison suspended in said neck ring, and means to stop the operation of the machine if any blow mold fails to open at a time prior to that of the raising of the blank mold which cooperates therewith in the formation of an article.

74. In a glass shaping machine, the combination of a clutch for transmitting power to operate said machine, said machine including a mold, means for closing said mold, a trip device cooperating therewith, and means operable by said trip device for disengaging said clutch to stop the operation of the machine in case the mold fails to close.

75. In a glass shaping machine, the combination of a mold adapted to be opened and closed, a clutch for transmitting power to operate said machine, means operated by the power so transmitted for closing said mold, said means including the member adapted to be moved in one path during the open position of said mold and in another path during the closed position thereof and means positioned in the first of said paths for engagement by said member and adapted to move said clutch out of engagement in the event that the mold fails to close.

76. In a glass shaping machine, the combination of a rotatable turret, a series of molds arranged around said turret, means moving with said turret to open and close said molds, said means including a member positioned at one distance from the axis of said turret when the molds are opened and at a different distance when the molds are closed, means adjacent to said turret for changing the radial position of said member for opening and closing said molds, a clutch for transmitting power to said machine, and means positioned adjacent to said turret and in the path of said member when the molds are opened to be engaged by said member in the event that the molds fail to close, the last named means being connected to said clutch to throw it out of engagement and stop the operation of the machine upon the non-closing of the molds.

77. In a glass shaping machine, a pressing plunger, pneumatic means for operating said plunger in predetermined timed relation to the operation of other parts of said machine, a clutch for transmitting power to said machine, and mechanical means for disengaging said clutch in the event that the pneumatic means fail to raise said plunger at its predetermined time.

78. In a glass shaping machine, a pressing plunger, pneumatic means for raising and lowering said plunger in predetermined timed relation in the cycle of operations of said machine, a clutch for transmitting mechanical power to said machine, and means for moving said clutch to its disengaged position to stop the operation of the machine, the last named means being actuated in response to the plunger remaining in its lowermost position after the predetermined time for raising it has elapsed.

79. In a glass shaping machine, a mold, means for moving said mold in a substantially vertical direction, a neck ring cooperating with said mold in its uppermost position, a clutch for transmitting power to said machine, and means for disengaging said clutch in the event that the mold fails to rise to a position in cooperation with said neck ring.

80. In a glass shaping machine, a mold, means to raise and lower said mold, said means including a resiliently mounted member, a clutch for transmitting power to said machine, and means for disengaging said clutch in the event that a mold meets with abnormal resistance in rising and said resiliently mounted member is thereby moved to an abnormal position.

81. In a glass shaping machine, a mold, means to raise and lower said mold, said means including a floating lever, one end of which is connected to raise and lower said mold and the other end of which is resiliently urged to a fixed predetermined position, means for applying power to said lever intermediate its ends, whereby if the mold meets with undue resistance in raising, the second named end of said lever will be moved by the actuating means out of its normal position, a clutch for transmitting power to said machine, means deriving power through said clutch for actuating said lever, and means connected with the second named end of said lever for disengaging said clutch in the event that said second named end is moved out of its normal position.

82. In a glass shaping machine, the combination of an intermittently rotated turret, a plurality of press molds arranged about said turret, a second intermittently rotated turret, a series of neck rings arranged about said second turret, said turrets being so disposed with relation to one another that the arcuate path of said press molds is tangent at a predetermined point to the arcuate path of said neck rings, means for rotating said turrets intermittently and in predetermined timed relation to one another to bring said neck ring and press molds successively in vertical alignment at the point of tangency of the paths of movement of their axes, and means for pressing a charge of glass in each press mold and neck ring successively at said point of tangency.

83. In a glass shaping machine, the combination of an intermittently rotated blank mold turret, an intermittently rotated blow mold turret, means for imparting intermittent rotation to said turrets, a series of vertically movable blank molds on said blank mold turret, a series of blow molds on said blow mold turret, a series of neck rings also on said blow mold turret and arranged to be closed in vertical axial alignment with said blow molds, said turrets being so positioned and arranged that the axes of the molds thereon are tangent at a point, means to raise and lower said blank molds into a position in cooperation with said neck rings at the point of tangency and between the open halves of the blow molds, means for forming a parison in said neck rings and blank molds at the point of tangency, means for lowering the blank molds to leave the parison suspended in said neck rings, means for thereafter closing the blow molds about the parisons, and means for blowing the parison to final form in said neck rings.

84. In a glass shaping machine, the combination of an intermittently rotated blank mold turret, an intermittently rotated blow mold turret, means for imparting intermittent rotation to said turrets, a series of vertically movable blank molds on said blank mold turret, a series of blow molds on said blow mold turret, a series of neck rings also on said blow mold turret and arranged to be closed in vertical axial alignment with said blow molds, said turrets being so positioned and arranged that the axes of the molds thereon are tangent at a point, means to direct charges of glass into said blank molds successively at a station other than that at the point of tangency, means for press forming the charges of glass successively at the point of tangency in the blank mold and neck rings, means for withdrawing the blank mold from about the parison leaving it suspended in the neck ring, means for thereafter closing the blow molds successively about said parison.

85. A glass forming machine, comprising a blank mold, a blow mold, automatic means to move said molds in closed orbital paths eccentric to each other, automatic means cooperating with said blank mold to form a glass blank having an opening therein, automatic means to transfer the blank so formed to said blow mold, automatic means mounted to move with and at times to cooperate with said blow mold for supplying blowing pressure to the interior of a glass article therein, automatic means to start and stop the application of blowing pressure applied by and through the last-named means to cause pressure to be applied to the interior of the article in said blow mold for a period of time, the duration of which is sufficient to maintain the glass in contact with the walls of said blow mold for the transfer of an amount of heat from the glass to the mold so that the article may be handled without deformation if removed from the mold upon the cessation of the blowing period, and automatic means for timing and controlling the operation of said cooperating blank forming means to cause a second blank to be at least partially formed thereby in said blank mold during and prior to the cessation of the application of blowing pressure in said blow mold to the interior of the article which was last formed in said blank mold.

86. A glass forming machine, comprising a rotatable blank mold carrier, a blank mold thereon, a rotatable blow mold carrier, a blow mold on said blow mold carrier, automatic means for imparting rotative movement to said carriers in timed relation one to the other, automatic means cooperating with said blank mold to form a blank having an opening therein, automatic means to transfer said blank to said blow mold, automatic means mounted on and moving with said blow mold carrier for supplying pressure to the interior of a blank within said blow mold, automatic means to start and stop the application of blowing pressure applied by and through the last-named means to cause pressure to be applied for a period of time during which said blow mold carrier is rotated through at least 180° whereby the article is maintained in good heat transferring relationship with the blow mold walls for the rapid extraction for heat from the article, and automatic means for timing and controlling the operation of said automatic blank forming means to cause a second blank to be at least partially formed thereby in said blank mold during and prior to the cessation of the application of blowing pressure in said blow mold to the interior of the article which was last formed in said blank mold.

87. A glass forming machine, comprising a rotatable blank mold carrier, a blank mold thereon, a rotatable blow mold carrier eccentric of said blank mold carrier, a blow mold on said blow mold carrier, automatic means for imparting intermittent rotative movements to said carriers to rotate them in timed relation one to the other, automatic means cooperating with said blank mold to form a blank having an opening therein, automatic means to transfer said blank to said blow mold, automatic means mounted on and moving with said blow mold carrier for supplying pressure to the interior of a blank within said blow mold for blowing the blank therein to final form during a period of time independent of the periods of movement and dwell of said blow mold carrier, automatic means to start and stop the application of blowing pressure applied by and through the last named means to cause pressure to be applied to the interior of the article being blown in said blow mold for a continuous and uninterrupted period of time, the duration of which is sufficient to maintain the glass in contact with the walls of said blow mold for the transfer of an amount of heat from the glass to the mold so that the article may be handled without deformation if removed from the mold upon the cessation of the blowing period, and automatic means for timing and controlling the operation of said automatic cooperating blank forming means to cause a second blank to be at least partially formed thereby in said blank mold during and prior to the cessation of the application of blowing pressure in said blow mold to the interior of the article which was last formed in said blank mold.

88. Glass forming machine comprising, a plurality of blank molds, a rotary support therefor, a plurality of blow molds, a rotary support for said blow molds eccentric of said blank mold support, automatic means for moving said supports to move the said blank molds and blow molds respectively in different closed orbital paths, automatic means cooperating with said blank molds to form glass blanks having openings therein, automatic means to transfer the blanks so formed to the blow molds, automatic means mounted to move with said blow molds and adapted at times to cooperate therewith for supplying blowing pressure to the interior of glass contained therein, automatic means to initiate and discontinue the application of blowing pressure applied by and through the last-named means to cause pressure to be applied to the interior of the glass in said blow molds for a selected period of time, and automatic means for timing and controlling the cooperation of said blank forming means with a given blank mold to cause a second blank to be at least partially formed in said given blank mold by said blank forming means during and prior to the cessation of the application of blowing pressure in a blow mold to the interior of a blank which was last formed in said given blank mold.

Signed at Hartford, Connecticut, this 12th day of June, 1922.

EDWARD H. LORENZ.